(12) United States Patent
Uchino

(10) Patent No.: US 6,865,965 B2
(45) Date of Patent: Mar. 15, 2005

(54) HYDRAULIC CONTROL SYSTEM OF AUTOMATED MANUAL TRANSMISSION

(75) Inventor: Satoshi Uchino, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/121,677

(22) Filed: Apr. 15, 2002

(65) Prior Publication Data

US 2002/0148310 A1 Oct. 17, 2002

(30) Foreign Application Priority Data

| Apr. 16, 2001 | (JP) | ................................... P. 2001-116464 |
| Apr. 16, 2001 | (JP) | ................................... P. 2001-116465 |
| Apr. 16, 2001 | (JP) | ................................... P.2001-116466 |
| Apr. 16, 2001 | (JP) | ................................... P.2001-116467 |

(51) Int. Cl.$^7$ ............................................. F16H 59/00
(52) U.S. Cl. ........................................ 74/335; 477/906
(58) Field of Search ............................. 74/335; 477/906

(56) References Cited

U.S. PATENT DOCUMENTS

| 4,627,312 | A | * | 12/1986 | Fujieda et al. ............. 74/336 R |
| 5,083,481 | A | * | 1/1992 | Smith et al. ................. 477/906 |
| 5,445,043 | A | * | 8/1995 | Eaton et al. ................... 74/335 |
| 5,682,792 | A | * | 11/1997 | Liesener et al. ............. 477/906 |
| 6,029,531 | A | * | 2/2000 | Riedhammer ................ 74/335 |
| 6,343,520 | B1 | * | 2/2002 | Ohashi et al. ................ 74/335 |
| 6,470,763 | B2 | * | 10/2002 | Ohashi et al. ................ 74/335 |
| 6,568,515 | B2 | * | 5/2003 | Harries ........................ 74/335 |

FOREIGN PATENT DOCUMENTS

| JP | 2000-55184 | 2/2000 |

* cited by examiner

*Primary Examiner*—Dirk Wright
(74) *Attorney, Agent, or Firm*—McGinn & Gibb, PLLC

(57) ABSTRACT

An automated manual transmission has an input shaft having a plurality of driving gears, and an output shaft having a plurality of driven gears engaging with the driving gears, and further has two bypass clutches for coupling the input shaft and the output shaft with each other and releasing them from coupling. Electromagnetic valves are provided in hydraulic oil paths for guiding hydraulic pressure from a hydraulic pressure supply portion to the bypass clutches respectively. A bypass oil path for bypassing the hydraulic oil paths is provided with a bypass oil path on-off valve for opening the bypass oil path when the electromagnetic valves cannot be operated due to a failure of an electric system. A bypass oil path change-over valve is provided for changing over to supply hydraulic pressure from the bypass oil path on-off valve to one of the bypass clutches.

27 Claims, 11 Drawing Sheets

HYDRAULIC CONTROL SYSTEM OF AUTOMATED MANUAL TRANSMISSION

BACKGROUND OF THE INVENTION

The present invention relates to a hydraulic control system of an automated manual transmission mounted on an automobile, and particularly relates to a technique effectively applied to an automated manual transmission having a plurality of change gear arrays.

A manual transmission (MT) for shifting gears by manual operation of a driver has an input shaft coupled with an engine and having a plurality of driving gears, and an output shaft coupled with driving wheels and having a plurality of driven gears respectively paired with the driving gears. A plurality of change gear arrays are provided between the input shaft and the output shaft. In such a MT, after a clutch is disconnected at the time of shift change, a pair of gears for transmitting power is switched selectively from the plurality of change gear arrays manually by use of a shift mechanism such as a synchro-mesh mechanism, and the clutch is then connected. Gear changing operation, that is, shift change is performed thus.

When the shift change and the clutch operation are carried out by a shift actuator which is operated by hydraulically, an automatic transmission based on the configuration of the manual transmission can be obtained. Such an automated manual transmission of this type (hereinafter referred to as "AMT") having a plurality of change gear arrays has an advantage over a regular torque-converter type automatic transmission (AT) having planetary gears or the like in an automatic shift mechanism. That is, according to the automated manual transmission, the number of parts is reduced so that the weight can be reduced easily, and the transmission efficiency of the driving system is high.

For example, in such an AMT as disclosed in Japanese Patent Laid-Open No. 2000-55184, a starting clutch for shifting a crank shaft of an engine and an input shaft between a coupling mode and an uncoupling mode, that is, an input clutch is provided between the crank shaft and the input shaft, and a bypass clutch of a hydraulic multiple disc clutch type for transmitting torque from the input shaft to an output shaft at the time of shift change is provided for preventing shortage of shift torque from occurring.

The AMT disclosed in this publication adopts a fail safe in which the first speed gear stage is forcedly set by a return spring when an oil pump as an oil pressure source has a breakdown. According to the related-art fail safe, however, when electromagnetic valves are out of control due to a failure of an electric system during running of the vehicle in the fifth speed gear stage while the wet multiple disc clutch is coupled, the gear is shifted to the first speed gear stage forcedly. Due to the sudden speed reduction caused by this forced shifting, not only is the vehicle unstable, but there also arises a problem that the starting clutch put in a half clutch position is worn or burned.

SUMMARY OF THE PRESENT INVENTION

An object of the present invention is to make it possible to keep the gear stage in an automated manual transmission with a bypass clutch even if there occurs a failure in an electric system during running of a vehicle.

An object of the present invention is also to make it possible to couple a bypass clutch corresponding to a specific gear stage in an automated manual transmission with bypass clutches so as to allow a vehicle to run ahead smoothly even if there occurs a failure in an electric system during running of the vehicle.

An object of the present invention is also to make it possible to surely shift an automated manual transmission to a reverse stage without any gear chatter or any interlock in the automated manual transmission with a bypass clutch when a select lever is operated to select a reverse range on the occasion where a failure occurs in an electric system during running of the vehicle.

An object of the present invention is also to make it possible to drive a vehicle ahead or reversely by the operation of a select lever in an automated manual transmission with a bypass clutch even if there occurs a failure in an electric system during running of the vehicle, and to make it possible to couple an input clutch only when only one gear stage is established.

According to a first aspect of the present invention, there is provided a hydraulic control system of an automated manual transmission comprising: an input shaft having a plurality of driving gears; an output shaft having a plurality of driven gears engaging with the driving gears; a shift actuator shifting a change gear array for transmitting power from the input shaft to the output shaft; a plurality of bypass clutches for carrying out coupling and uncoupling between the input shaft and the output shaft respectively; a plurality of electromagnetic valves provided in a plurality of hydraulic oil paths which guide hydraulic pressure from a hydraulic pressure supply portion to the respective bypass clutches, for opening and closing the corresponding hydraulic oil paths respectively; and a bypass oil path on-off valve provided in a bypass oil path which bypasses the respective hydraulic oil paths, for opening the bypass oil path when the electromagnetic valves cannot be operated due to a failure in an electric system.

According to a second aspect of the present invention, there is provided a hydraulic control system of an automated manual transmission as set forth in the first aspect of the present invention, further comprising: a bypass oil path change-over valve adapted to be changed over to supply hydraulic pressure from the bypass oil path on-off valve to the plurality of bypass clutches.

According to a third aspect of the present invention, there is provided a hydraulic control system of an automated manual transmission as set forth in the second aspect of the present invention, wherein the bypass oil path change-over valve changes over to a position to supply hydraulic pressure to one of the bypass clutches on a failure occasion of the electric system, while the bypass oil path change-over valve is brought into a switching mode using hydraulic pressure front the hydraulic oil path as pilot pressure when hydraulic pressure from the hydraulic oil path is supplied to another one of the bypass clutches on a normal occasion of the electric system, and the switching mode is maintained also on a failure occasion of the electric system.

According to the first to third aspects of the present invention, even if the electromagnetic valves do not work due to a failure of the electric system, one of the plurality of bypass clutches for coupling the input shaft and the output shaft in predetermined gear stages respectively is kept in a coupling condition. Thus, by the bypass clutch, the vehicle can be driven in the specific gear stage that was set at the time of normal running. Accordingly, sudden speed reduction of the vehicle is prevented from occurring at the time of a failure.

According to a forth aspect of the present invention, there is provided a hydraulic control system of an automated manual transmission as set forth in the second aspect of the present invention, further comprising: a fail safe valve for changing over between discharge of pilot pressure and suspension of the discharge in accordance with a normal occasion and a failure occasion of an electric system; a reverse servo valve for discharging hydraulic pressure when a reverse range is selected by operation of a select lever; and a fail mode valve for actuating the bypass oil path change-over valve so as to supply hydraulic pressure to a specific one of the bypass clutches when the fail safe valve detects a failure occasion of the electric system while hydraulic pressure is supplied from the reverse servo valve.

According to the fifth aspect of the present invention, there us provided a hydraulic control system of an automated manual transmission as set forth in the fifth aspect of the present invention, wherein the fail mode valve supplies hydraulic pressure to the bypass oil path change-over valve when an engine is suspended while there occurs a failure in the electric system.

According to the forth and fifth aspects of the present invention, in an automated manual transmission in which an input shaft and an output shaft are coupled and uncoupled in predetermined gear stages by a plurality of bypass clutches, when there occurs a failure in an electric system, a bypass oil path change-over valve operates to guide hydraulic pressure to a bypass clutch corresponding to a specific gear stage. Accordingly, even on the occasion of the failure of the electric system, the vehicle is allowed to run ahead. When the bypass clutch supplied with the hydraulic pressure is set on the lower speed stage side, the vehicle can run more smoothly.

According to a sixth aspect of the present invention, there is provided a hydraulic control system of an automated manual transmission comprising: an input shaft having a plurality of driving gears; an output shaft having a plurality of driven gears engaging with the driving gears; a shift actuator shifting a change gear array for transmitting power from the input shaft to the output shaft; a bypass clutch for carrying out coupling and uncoupling between the input shaft and the output shaft; a reverse servo valve for switching the automated manual transmission to one of a forward stage and a reverse stage in accordance with operation of a select lever, the reverse servo valve supplying hydraulic pressure when the automated manual transmission is switched to the reverse stage; and a fail mode valve for supplying hydraulic pressure to the shift actuator so as to set the shift actuator in a neutral position when hydraulic pressure is supplied from the reverse servo valve on an occasion of a failure in an electric system; wherein the hydraulic pressure is supplied from the reverse servo valve to the bypass clutch.

According to a seventh aspect of the present invention, there is provided a hydraulic control system of an automated manual transmission comprising: an input shaft having a plurality of driving gears; an output shaft having a plurality of driven gears engaging with the driving gears; a shift actuator shifted a change gear array for transmitting power from the input shaft to the output shaft; an input clutch for carrying out coupling and uncoupling between an engine and the input shaft; a bypass clutch for carrying out coupling and uncoupling between the input shaft and the output shaft; a reverse servo valve for switching the automated manual transmission to one of a forward stage and a reverse stage in accordance with operation of a select lever, the reverse servo valve supplying hydraulic pressure when the automated manual transmission is switched to the reverse stage; a fail mode valve for supplying hydraulic pressure to the shift actuator so as to set the shift actuator in a neutral position when hydraulic pressure is supplied from the reverse servo valve on an occasion of a failure in an electric system; and a neutral position detecting valve for supplying hydraulic pressure for coupling to the input clutch when the shift actuator takes the neutral position; wherein the hydraulic pressure supplied from the neutral position detecting valve is supplied to the input clutch, while the hydraulic pressure supplied from the reverse servo valve is supplied to the bypass clutch.

According to the sixth and seventh aspects of the present invention, when the select lever is operated to select the reverse range on a failure occasion where a failure occurs in an electric system during the running of the vehicle, the reverse servo valve allows a change gear array for the reverse to come into engagement so that hydraulic pressure is supplied to the bypass clutch. Further, the shift actuator for shifting the change gear array is switched to a neutral position by the fail mode valve. Thus, when the reverse range is selected on a failure occasion of the electric system, the vehicle can be moved reversely by shifting the rest of the change gear arrays except the reverse change gear array to a neutral position.

In addition, according to the sixth and seventh aspects of the present invention, when the select lever is operated to select the reverse range on a failure occasion, the reverse servo valve allows a change gear array for the reverse to come into engagement so that hydraulic pressure is supplied to the bypass clutch. Further, the shift actuator for shifting the change gear array is switched to a neutral position by the fail mode valve. When the shift actuator takes the neutral position, hydraulic pressure is supplied to the input clutch through the neutral position detecting valve so that the input clutch is coupled. Thus, the change gear array for the reverse comes into engagement before the input clutch is coupled. It is therefore possible to prevent gear chatter from occurring.

According to eighth aspect of the present invention, there is provided a hydraulic control system of an automated manual transmission comprising: an input shaft having a plurality of driving gears; an output shaft having a plurality of driven gears engaging with the driving gears; an input clutch for carrying out coupling and uncoupling between an engine and the output shaft; a plurality of shift actuators for shifting a change gear array for transmitting power from the input shaft to the output shaft; a fail mode valve for supplying hydraulic pressure to the shift actuators so that the shift actuators take neutral positions on a failure occasion of an electric system; and neutral position detecting valves for supplying hydraulic pressure from a hydraulic pressure supply portion to the input clutch when the shift actuators take the neutral positions; wherein the hydraulic pressure is supplied to the input clutch through the neutral position detecting valves.

According to a ninth aspect of the present invention, there is provided a hydraulic control system of an automated manual transmission as set forth in the eighth aspect of the present invention, wherein a fail safe valve for the input clutch is provided in an oil path for supplying hydraulic pressure to the input clutch on a normal occasion of electric system, the fail safe valve blocking the oil path in accordance with hydraulic pressure from the fail mode valve on the failure occasion of the electric system.

According to the eighth and ninth aspects of the present invention, on a failure occasion where there occurs a failure in the electric system, when a select lever is operated to select a drive range from a reverse range or a neutral range, the input shaft and the output shaft are coupled in a predetermined change gear array by the bypass clutch so that one gear stage is established. Further, after the shift actuators take their neutral positions, hydraulic pressure is supplied to the input clutch through the neutral position detecting valves for detecting the neutral positions so that the input clutch is coupled. In such a manner, the input clutch is coupled only when the shift actuators take the neutral positions.

DESCRIPTION OF THE PRESFERRED EMBODIMENTS

An embodiment of the present invention will be described below in detail with reference to the drawings.

Figure 1:
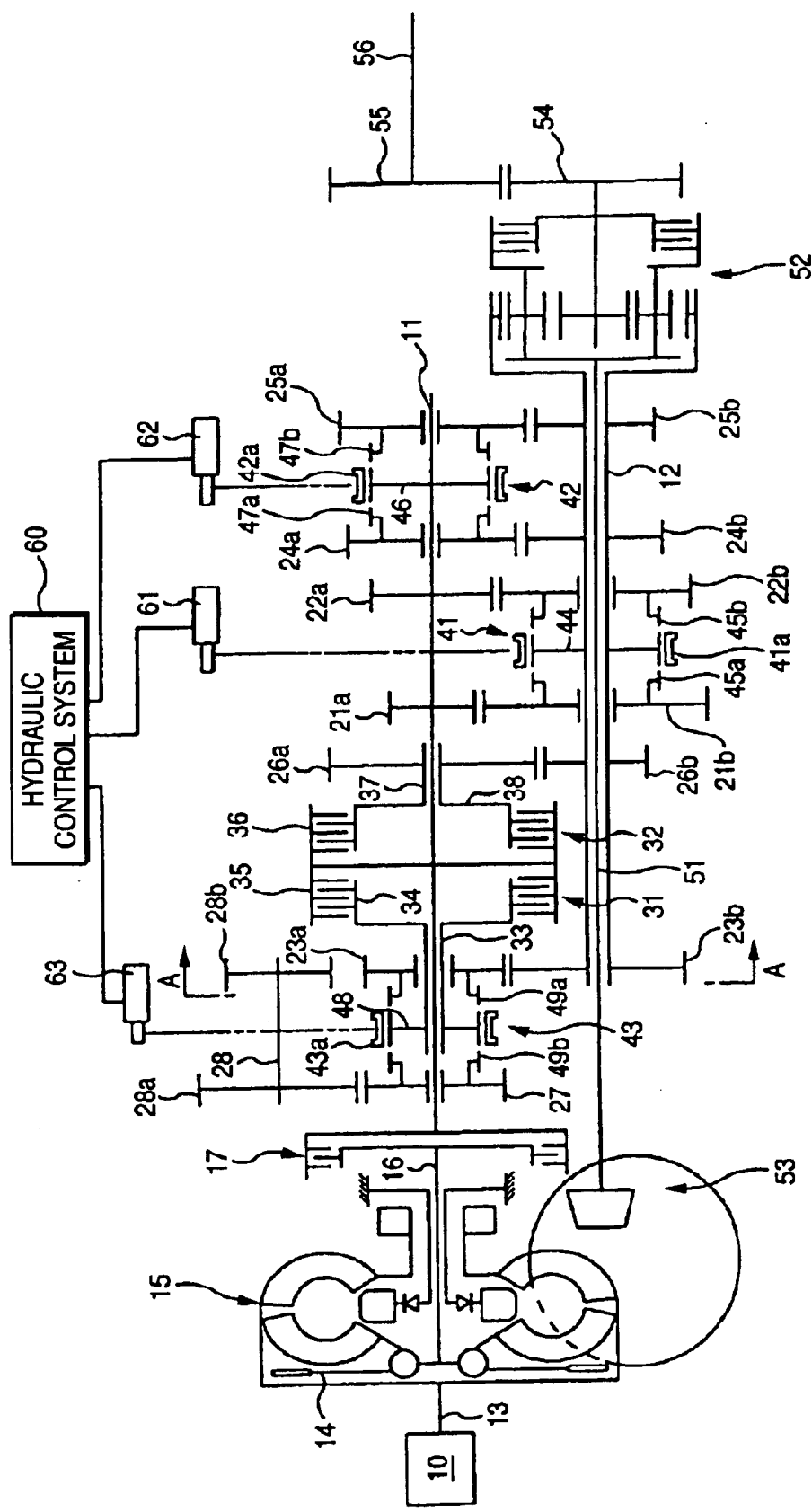
FIG. 1 is a skeleton diagram showing an automated manual transmission having a hydraulic control system according to an embodiment of the present invention.
Figure 2:
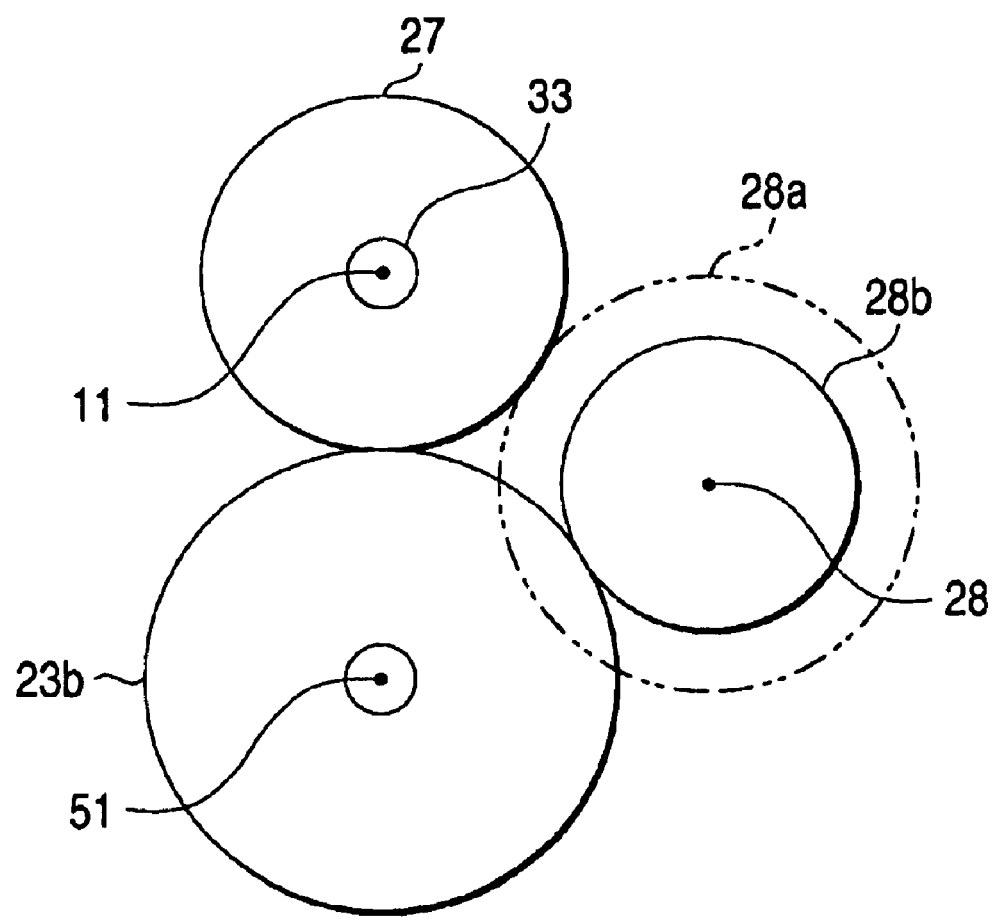
FIG. 2 is a skeleton diagram taken on line A—A in FIG. 1, showing an engagement state of gears.

FIG. 1 is a skeleton diagram showing an automated manual transmission having a hydraulic control system according to an embodiment of the present invention. FIG. 2 is a skeleton diagram taken on line A—A in FIG. 1, showing an engagement state of gears. This automated manual transmission has an input shaft 11 to be coupled with an engine 10, and an output shaft 12 to be coupled with driving wheels in parallel with the input shaft 11. The input shaft 11 and the output shaft 12 are incorporated in a not-shown transmission case so as to look toward the traveling direction of a vehicle. This automated manual transmission is applicable to a four-wheel-drive vehicle whose transmission is disposed longitudinally.

A torque converter 15 having a lock-up clutch 14 is coupled with a crank shaft 13 of the engine 10. Between the input shaft 11 and a turbine shaft 16 which is an output shaft of the torque converter 15, there is provided a starting clutch, that is, an input clutch 17 of a wet multiple disc type for changing over between a coupling mode in which the turbine shaft 16 is coupled with the input shaft 11 and a release mode in which the turbine shaft 16 is released from the coupling. Driving gears 21a and 22a for the first speed and the second speed are fixed to the input shaft 11 while driving gears 23a to 25a for the third to fifth speeds are rotatable with respect to the input shaft 11. Driven gears 21b and 22b for the first speed and the second speed are rotatably attached to the output shaft 12 while driven gears 23b to 25b for the third to fifth speeds are fixed to the output shaft 12. These driven gears engage with their corresponding driving gears so as to form forward stage change gear arrays.

The input shaft 11 is provided with two, first and second, bypass clutches 31 and 32. The first bypass clutch 31 has a clutch hub 34 and a clutch drum 35. The clutch hub 34 is fixed to a hollow shaft 33 fitted into the input shaft 11 rotatably and supporting the third-speed driving gear 23a rotatably. The clutch drum 35 is fixed to the input shaft 11. By pressing a plurality of clutch discs provided alternately on the clutch hub 34 and the clutch drum 35, the bypass clutch 31 is brought into an engagement mode, that is, a power transmission mode so that the power of the input shaft 11 is transmitted to the hollow shaft 33. On the contrary, when the engagement is released, the bypass clutch 31 is brought into a mode to block the transmission of the power.

The second bypass clutch 32 has a clutch drum 36 and a clutch hub 38. The clutch drum 36 is fixed to the input shaft 11. The clutch hub 38 is fixed to a hollow shaft 37 fitted into the input shaft 11 rotatably. By pressing a plurality of clutch discs provided alternately on the clutch drum 36 and the clutch hub 38, the bypass clutch 32 is brought into an engagement mode so that the power of the input shaft 11 is transmitted to the hollow shaft 37. On the contrary, when the engagement is released, the bypass clutch 32 is brought into a mode to block the transmission of the power. Since the bypass clutches 31 and 32 are provided adjacently to each other on the input shaft 11, the two clutch drums 35 and 36 are united.

A driving gear 26a for the sixth speed is fixed to the hollow shaft 37 of the bypass clutch 32. This gear 26a engages with a sixth-speed driven gear 26b fixed to the output shaft 12. A driving gear 27 for the reverse is rotatably attached to the input shaft 11. An idle gear 28a engaging with the reverse driving gear 27 and an idle gear 28b engaging with the third-speed driven gear 23b are fixed to an idle shaft 28 disposed in parallel with the input shaft 11, as shown in FIG. 2. The number of teeth of the idle gear 28b is set to be smaller than the number of teeth of the idle gear 28a. That is, the idle gear 28b is formed as a gear smaller in diameter than the idle gear 28a. The third-speed driven gear 32b in engagement with this idle gear 28b is also used as a driven gear for the reverse.

The driving gears 21a to 26a engage with the corresponding driven gears 21b to 26b respectively so as to form change gear arrays, that is, gear stages. Shift change is carried out by switching a change gear array which, in turn, transmits the power. A first switching mechanism 41 for switching the change gear array to either the first speed or the second speed is attached to the output shaft 12 while a second switching mechanism 42 for switching the gear stage to either the fourth speed or the fifth speed is attached to the input shaft 11. Further, a third switching mechanism 43 for shifting the gear stage to either the third speed or the reverse is attached to the input shaft 11. Each of the switching mechanisms 41 to 43 is formed as a synchro-mesh mechanism.

The first switching mechanism 41 has a synchro-hub 44 and a synchro-sleeve 41a always engaging therewith. The synchro-hub 44 is disposed between the two driven gears 21b and 22b for the first speed and the second speed and fixed to the output shaft 12. When the synchro-sleeve 41a is brought into engagement with a spline 45a formed integrally with the driven gear 21b, the transmission gear ratio is set in the first speed. On the contrary, when the synchro-sleeve 41a is brought into engagement with a spline 45b formed integrally with the driven gear 22b, the transmission gear ratio is set in the second speed.

Similarly, the second switching mechanism 42 has a synchro-hub 46 and a synchro-sleeve 42a always engaging therewith. The synchro-hub 46 is disposed between the two driving gears 24a and 25a for the fourth speed and the fifth speed and fixed to the input shaft 11. When the synchro-sleeve 42a is brought into engagement with a spline 47a formed integrally with the driving gear 24a, the transmission gear ratio is set in the fourth speed. On the contrary, when the synchro-sleeve 42a is brought into engagement with a spline 47b formed integrally with the driving gear 25a, the transmission gear ratio is set in the fifth speed.

Further, the third switching mechanism 43 has a synchro-hub 48 and a synchro-sleeve 43a always engaging therewith. The synchro-hub 48 is disposed between the two driving gears 23a and 27 respectively for the third speed and the reverse and fixed to the hollow shaft 33. When the synchro-sleeve 43a is brought into engagement with a spline 49a formed integrally with the driving gear 23a, the transmission gear ratio is set in the third speed. On the contrary, when the synchro-sleeve 43a is brought into engagement with a spline 49b formed integrally with the driving gear 27, the rotation of the input shaft 11 is transmitted to the output shaft 12 through the idle shaft 28 so that the transmission gear ratio is set in the reverse stage.

Accordingly, switching between the first speed and the second speed is carried out by actuating the synchro-sleeve 41a of the first switching mechanism 41 while switching between the fourth speed and the fifth speed is carried out by actuating the synchro-sleeve 42a of the second switching mechanism 42. On the other hand, switching between the third speed and the reverse stage is carried out by bringing the first bypass clutch 31 into the release mode to thereby transmit the power to the synchro-hub 48 through the hollow shaft 33 while actuating the synchro-sleeve 43a of the third switching mechanism 43 and then bringing the first bypass clutch 31 into the engagement mode. Further, switching between the fifth speed and the sixth speed is carried out by the actuation of the synchro-sleeve 42a of the second switching mechanism 42 and the actuation of the second bypass clutch 32.

When the first bypass clutch 31 is brought into the engagement mode, the input shaft 11 and the output shaft 12 can be coupled in the third-speed gear ratio. When the second bypass clutch 32 is brought into the engagement mode, the input shaft 11 and the output shaft 12 can be coupled in the sixth-speed gear ratio. In addition, since this automated manual transmission has the bypass clutches 31 and 32, shift change can be carried out while the power is transmitted through the bypass clutch 31 or 32 in the state that the input clutch 17 is set in the coupling mode. Thus, the torque can be prevented from dropping down at the time of shift change.

The automated manual transmission has ahead six gear stages. Of the six gear stages, the first to third speeds are classified as a group of low-speed stages, and the fourth to sixth speeds are classified as a group of high-speed stages. When shift change is performed in the low-speed stage group, torque is transmitted from the input shaft 11 to the output shaft 12 with the first bypass clutch 31 in the engagement mode. On the other hand, when shift change is performed in the high-speed stage group or between the third speed and the fourth speed, torque is transmitted with the second bypass clutch 32 in the engagement mode. In such a manner, different systems are used as the torque transmission path in accordance with the gear stage by the two bypass clutches 31 and 32. Thus, the difference in transmitted torque via the bypass clutch at the time of shift change can be set to be small in accordance with the gear stage.

An electronically controlled throttle for adjusting the engine torque or the engine speed is provided in the engine 10. Generally, the electronically controlled throttle is opened/closed for engine control on the basis of an output signal from an electronic control system in accordance with the quantity with which a not-shown axel pedal is depressed. Alternatively, if necessary, the electronically controlled throttle can be opened/closed for engine control on the basis of a predetermined map in accordance with detected driving conditions, independently of the depression of the axel pedal.

A front-wheel output shaft 51 is incorporated inside the hollow output shaft 12. The front-wheel output shaft 51 is coupled with the output shaft 12 through a center differential unit 52 while being coupled with a not-shown front-wheel drive shaft through a front differential unit 53. In addition, the center differential unit 52 is coupled with a rear-wheel output shaft 56 through a driving gear 54 and a driven gear 55, and the rear-wheel output shaft 56 is coupled with a rear-wheel drive shaft through a not-shown rear differential unit. In the case of an FF vehicle, the output shaft 12 is coupled directly with the front-wheel differential unit. In the case of an FR vehicle, the output shaft 12 is coupled directly with the rear-wheel differential unit.

As shown in FIG. 1, the automated manual transmission has a first shift actuator 61 for switching the change gear array to either the first speed or the second speed, and a second shift actuator 62 for switching the change gear array to either the fourth speed or the fifth speed. The first shift actuator 61 operates in a position where the synchro-sleeve 41a is brought into engagement with the spline 45a so as to set the change gear array in the first speed, a position where the synchro-sleeve 41a is brought into engagement with the spline 45b so as to set the change gear array in the second speed, and a neutral position where the synchro-sleeve 41a is not in engagement with either the spline 45a or the spline 45b. The second shift actuator 62 operates likewise in three positions of the fourth speed, the fifth speed and the neutral position.

The automated manual transmission has a reverse servo valve 63 having a function as a reverse actuator for switching the change gear array to either the third speed or the reverse. This servo valve 63 operates in three positions, that is, a position where the synchro-sleeve 43a is brought into engagement with the spline 49b so as to set the change gear array to a reverse range, a position where the synchro-sleeve 43a is brought into engagement with the spline 49a so as to set the change gear array in the third speed, and a neutral position where the synchro-sleeve 43a is not in engagement with either the spline 49a or the spline 49b. The operations of the shift actuators 61 and 62 and the reverse servo valve 63 are controlled by a hydraulic control system 60. This hydraulic control system 60 is designed to supply hydraulic pressure also to the input clutch 17 and the first and second bypass clutches 31 and 32.

Figure 3:
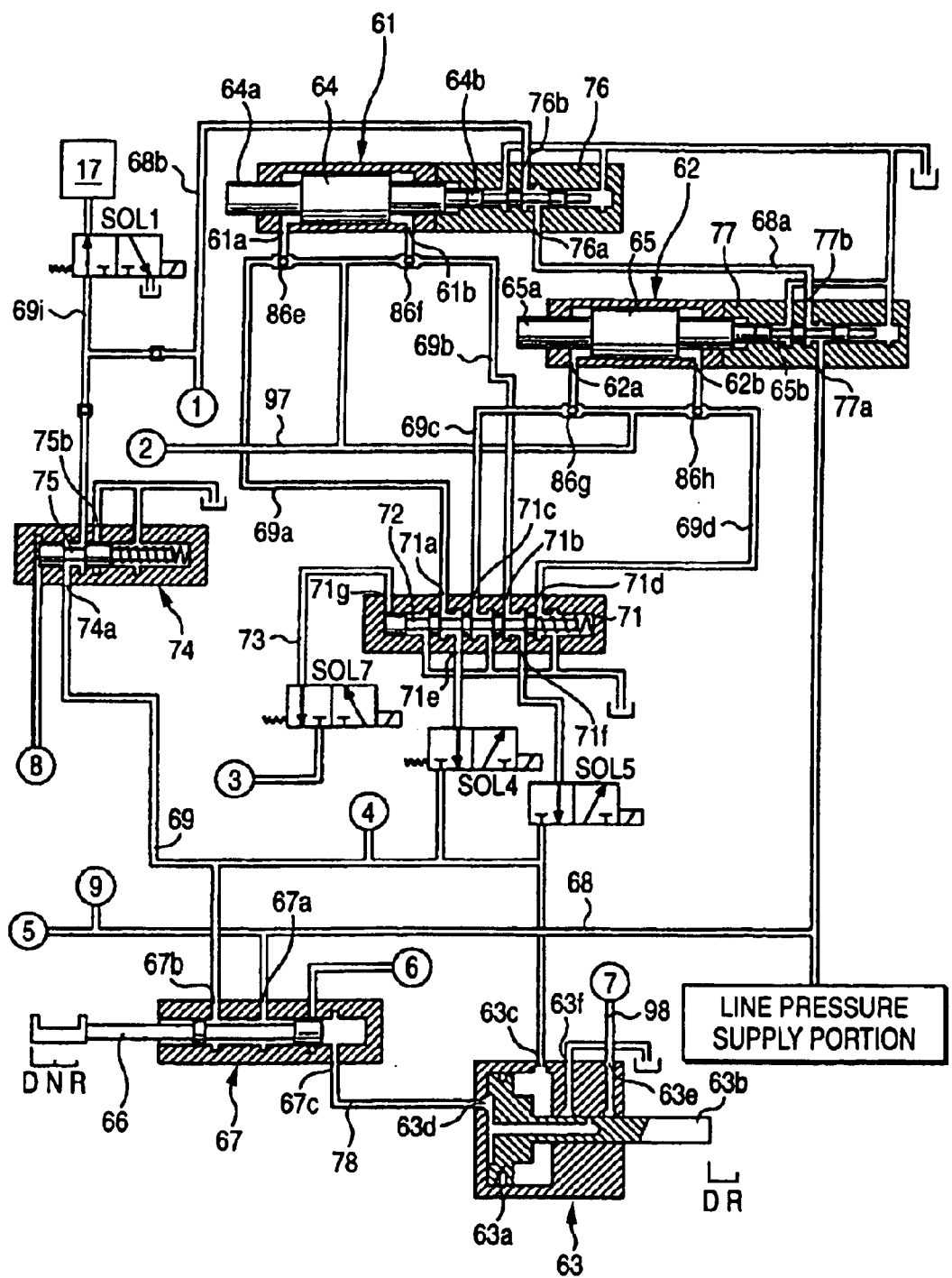
FIG. 3 is a hydraulic circuit diagram showing a hydraulic control system of the automated manual transmission.
Figure 4:
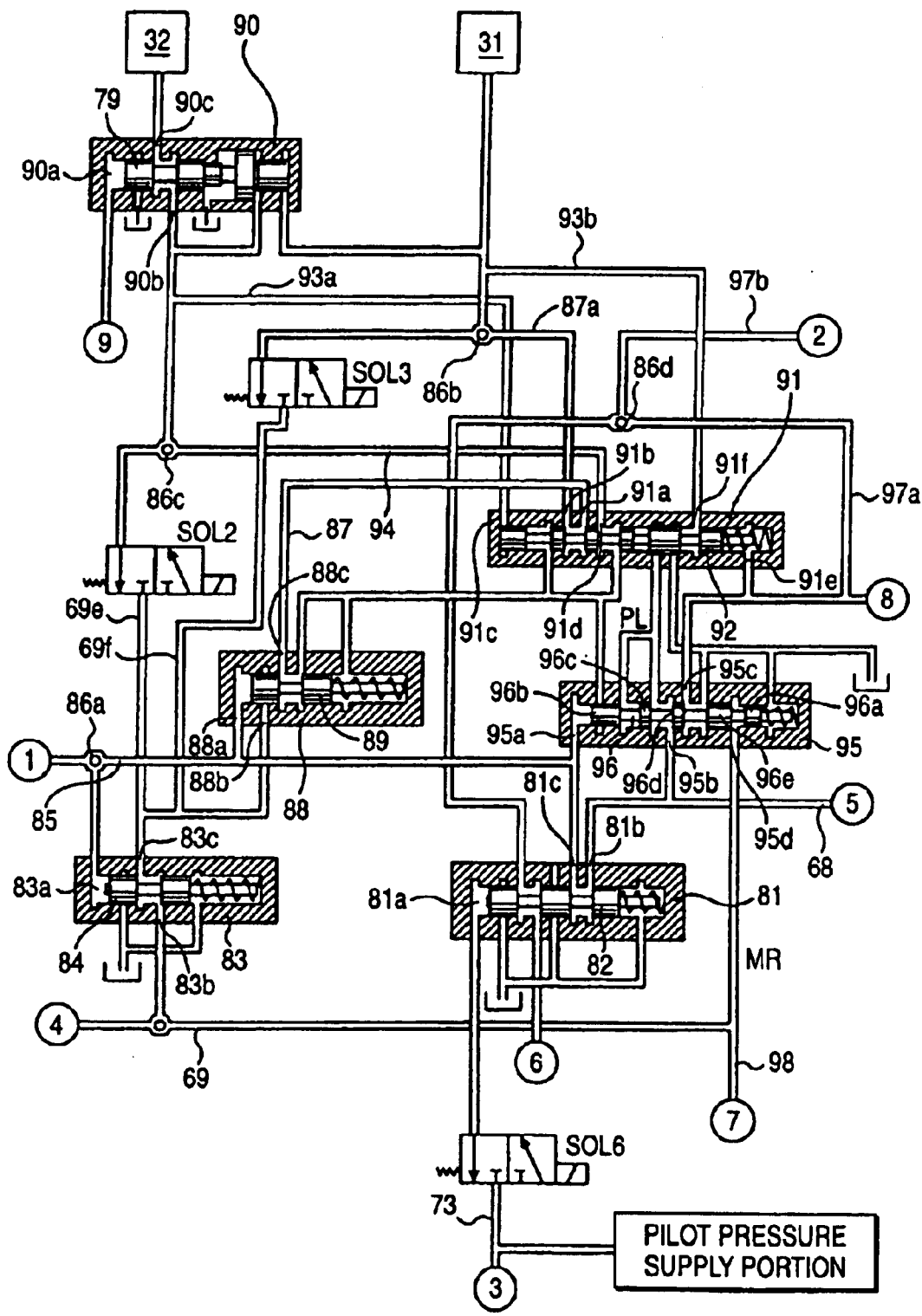
FIG. 4 is a hydraulic circuit diagram showing the hydraulic control system of the automated manual transmission.

FIGS. 3 and 4 are hydraulic circuit diagrams showing the hydraulic control system 60 of the automated manual transmission respectively. FIG. 3 shows the portion which controls the operations of the input clutch 17 and the two shift actuators 61 and 62. FIG. 4 shows the portion which controls the operations of the bypass clutches 31 and 32. In these hydraulic circuit diagrams, the portions numbered 1 to 9 in one diagram are connected to the corresponding portions in the other diagram respectively.

As shown in FIG. 3, the first shift actuator 61 has a piston 64 mounted movably to-and-fro axially, with a piston rod 64a coupled with the synchro-sleeve 41a through a not-shown interlocking member. Similarly, the second shift actuator 62 has a piston 65 mounted movably to-and-fro axially, with a piston rod 65a coupled with the synchro-sleeve 42a through a not-shown interlocking member.

The shift actuator 61 has ports 61a and 61b respectively communicating with oil chambers formed on the opposite sides of the piston 64. Similarly, the shift actuator 62 has ports 62a and 62b respectively communicating with oil chambers formed on the opposite sides of the piston 65. In each shift actuator 61, 62, the piston rod 64a, 65a moves reversely when hydraulic pressure is supplied to the port 61a, 62a for the reverse. On the contrary, when hydraulic pressure is supplied to the port 61b, 62b for the ahead, the piston rod 64a, 65a moves ahead. On the other hand, when hydraulic pressure is supplied through both the ports, the piston rod 64a, 65a takes a neutral position. When the piston rod 64a of the first actuator 61 moves ahead, the synchro-sleeve 41a moves to a position of either the first speed or the second speed. On the contrary, when the piston rod 64a moves reversely, the synchro-sleeve 41a moves to the other position so that the change gear array is shifted to the first speed or the second speed. Similarly, in the second actuator 62, the change gear array is shifted to the fourth speed or the fifth speed by the ahead or reverse motion of the piston rod 65a.

A not-shown shift lever, that is, a select lever operated by a driver is provided in the vehicle interior. A spool valve shaft 66 activated by this select lever is provided in a manual valve 67. A line pressure oil path 68 is connected to a line pressure port 67a formed in the manual valve 67. A line pressure supply portion having a not-shown pump and a not-shown pressure governor or the like for adjusting the line pressure to a predetermined value is connected to this line pressure oil path 68. Further, the manual valve 67 is provided with a D port 67b allowed to communicate with the line pressure port 67a when the manual valve 67 moves to a D position corresponding to the drive range by the select lever, and an R port 67c allowed to communicate with the line pressure port 67a when the manual valve 67 moves to an R position corresponding to the reverse range.

A hydraulic oil path 69 is connected to the D port 67b. An actuator 71 is provided partly between the shift actuator 61 and the manual valve 67 and partly between the sift actuator 62 and the manual valve 67 so that the supply of the hydraulic pressure from the hydraulic oil path 69 is switched to either the shift actuator 61 or the actuator 62. The actuator change-over valve 71 has an output port 71a connected to the port 61a of the shift actuator 61 through a hydraulic oil path 69a, and an output port 71b connected to the port 61b through a hydraulic oil path 69b. In addition, the actuator change-over valve 71 has an output port 71c connected to the port 62a of the shift actuator 62 through a hydraulic oil path 69c, and an output port 71d connected to the port 62b through a hydraulic oil path 69d.

An electromagnetic valve SOL4 is provided in the hydraulic oil path 69 so as to change over between a mode for supplying the hydraulic pressure from the hydraulic oil path 69 to an input port 71e provided in the actuator change-over valve 71 and a mode for suspending the supply of the hydraulic pressure. An electromagnetic valve SOL5 is provided in the hydraulic oil path 69 so as to change over between a mode for supplying the hydraulic pressure from the hydraulic oil path 69 to an input port 71f and a mode for suspending the supply of the hydraulic pressure. These electromagnetic valves SOL4 and SOL5 are normally closed. The actuator change-over valve 71 has a spool valve shaft 72 actuated by pilot pressure and spring force. A normally closed electromagnetic valve SOL7 is provided in a pilot pressure path 73 provided to communicate with a pilot port 71g. When an electric current is not supplied to this electromagnetic valve SOL7, the input port 71e and the output port 71a are brought into communication with each other while the input port 71f and the output port 71b are brought into communication with each other. When an electric current is supplied to the electromagnetic valve SOL4 in this state, hydraulic pressure is supplied into the oil chamber from the reverse port 61a of the shift actuator 61 so that the piston rod 64a moves reversely. On the other hand, when an electric current is supplied to the coil of the electromagnetic valve SOL5, hydraulic pressure is supplied into the oil chamber from the ahead port 61b so that the piston rod 64a moves ahead. Further, when an electric current is applied to both the electromagnetic valves SOL4 and SOL5, hydraulic pressure is supplied to both the oil chambers so that the piston rod 64a takes a neutral position.

On the other hand, when an electric current is supplied to the coil of the electromagnetic valve SOL7, the spool valve shaft 72 slides against the spring force so that the input port 71e and the output port 71c are brought into communication with each other while the input port 71f and the output port 71d are brought into communication with each other. By controlling the electric conduction to the respective electromagnetic valves SOL4 and SOL5 in this state, the piston rod 65a can be set to take any one of an ahead position, a reverse position and a neutral position. By operating the actuator change-over valve 71 to thereby change over in such a manner, shift change using the two shift actuators 61 and 62 can be carried out by common electromagnetic valves SOL4 and SOL5.

The hydraulic oil path 69 is connected to the input clutch 17, and a normally open electromagnetic valve SOL1 is provided in the hydraulic oil path 69. Since this electromagnetic valve SOL1 is normally open, when an electric current is not applied to the electromagnetic valve SOL1, hydraulic pressure is supplied to the input clutch 17 so that the input clutch 17 is brought into connection. When an electric current is applied, the hydraulic pressure is discharged so that the input clutch 17 is brought into disconnection. A fail safe valve 74 for the input clutch is provided in the hydraulic oil path 69. In a condition of being supplied with no pilot pressure, a spool valve shaft 75 provided slidably in this fail safe valve 74 makes an input port 74a and an output port 74b communicate with each other.

Neutral position detecting valves 76 and 77 are provided in the first and second actuators 61 and 62 respectively. The neutral position detecting valves 76 and 77 have spool valve shafts 64b and 65b actuated by the pistons 64 and 65 respectively. The neutral position detecting valve 77 is provided with an input port 77a to which the line pressure oil path 68 is connected, and an output port 77b corresponding to the input port 77a. The neutral position detecting valve 76 is provided with an input port 76a connected to the output port 77b through an oil path 68a, and an output port 76b corresponding to the input port 76a. The output port 76b is connected to a hydraulic oil path 69i between the electromagnetic valve SOL1 and the fail safe valve 74 through an oil path 68b.

The reverse servo valve 63 has a to-and-fro movable piston 63a, with a piston rod 63b coupled with the synchro-sleeve 43a shown in FIG. 1 through a not-shown interlocking member. A D port 63c provided in the reverse servo valve 63 is connected to the hydraulic oil path 69. When hydraulic pressure is supplied from this D port 63c, the piston rod 63b takes a D position as shown in FIG. 3. On the other hand, an R port 63d is provided in the reverse servo valve 63. The R port 67c and the R port 63d are connected through an oil path 78. Consequently, when the reverse range is selected by the select lever, the piston rod 63b is driven to take the R position so that the synchro-sleeve 43a in FIG. 1 engages with the spline 49b. Incidentally, FIG. 3 shows the state where the two shift actuators 61 and 62 take the neutral positions so that the actuator change-over valve 71 and the fail safe valve 74 are respectively supplied with no pilot pressure.

As shown in FIG. 4, in order to supply hydraulic pressure to the two bypass clutches 31 and 32, a hydraulic oil path 69e communicating with the hydraulic oil path 69 is connected to the bypass clutch 32 while a hydraulic oil path 69f communicating with the hydraulic oil path 69 is connected to the bypass clutch 31. An electromagnetic valve SOL2 is provided in the hydraulic oil path 69e, and an electromagnetic valve SOL3 is provided in the hydraulic oil path 69f. The respective electromagnetic valves SOL2 and SOL3 are normally closed. Accordingly, electric conduction to the electromagnetic valve SOL2 leads to the coupling mode of the bypass clutch 32, and the release of the electric conduction leads to the release mode of the bypass clutch 32. On the other hand, electric conduction to the electromagnetic valve SOL3 leads to the coupling mode of the bypass clutch 31, and the release of the electric conduction leads to the release mode of the bypass clutch 31.

Description will be made below on the operating modes of the respective electromagnetic valves in the normal running state by the hydraulic control system. First, electric conduction to the electromagnetic valve SOL1 leads to the disconnection mode of the input clutch 17 so that the power of the turbine shaft 16 is not transmitted to the input shaft 11. On the other hand, the release of the electromagnetic valve SOL1 from the electric conduction leads to the coupling mode of the input clutch 17 so that the power of the engine is transmitted to the input shaft 11. Switching between the first speed and the second speed is carried out by electric conduction to either the electromagnetic valve SOL4 or the electromagnetic valve SOL5. Electric conduction to both the electromagnetic valves SOL4 and SOL5 leads to no setting in either the first speed or the second speed. Similarly, switching between the fourth speed and the fifth speed is carried out by electric conduction to one of the electromagnetic valve SOL4 and the electromagnetic valve SOL5 under the electric conduction to the electromagnetic valve SOL7. Electric conduction to both the electromagnetic valves SOL4 and SOL5 leads to no setting in either the fourth speed or the fifth speed.

On the occasion where a failure occurs in an electric system when the change gear array is in the first speed, the second speed, the fourth speed or the fifth speed, the normally closed electromagnetic valves SOL4, SOL5 and SOL7 are turned off. However, due to the engagement resistance between the synchro-sleeve and the spline or a detent mechanism, the change gear array in question is kept. Thus, the vehicle can keep on running. When the neutral range is selected by the select lever under such a change gear array, the line pressure oil path 68 is closed so that the supply of hydraulic pressure to the input clutch 17 is cut.

On the other hand, on the occasion where a failure occurs in an electric system when the change gear array has been set in the third speed or the sixth speed, hydraulic pressure is lost because such a change gear array is established by either the bypass clutch 31 or the bypass clutch 32. Thus, the change gear array in question cannot be kept.

Therefore, as shown in FIG. 4, this automated manual transmission has a fail safe valve 81. This fail safe valve 81 has a spool valve shaft 82 actuated by pilot hydraulic pressure and spring force. In a pilot pressure path 73 communicating with a pilot port 81a, a normally closed electromagnetic valve SOL6 is provided to open and closed this oil path. The fail safe valve 81 is provided with a line pressure port 81b connected to the line pressure oil path 68, and an output port 81c allowed to communicate with the line pressure port 81b when the pilot pressure is supplied in response to electric conduction to the electromagnetic valve SOL6. This output port 81c is closed by the spool valve shaft 82 when the electric conduction to the electromagnetic valve SOL6 is suspended.

A bypass fail safe valve 83 is provided in the hydraulic oil path 69e. This bypass fail safe valve 83 has a spool valve shaft 84 actuated by use of the line pressure as pilot pressure. A pilot port 83a is connected to the output port 81c of the fail safe valve 81 by an oil path 85. When hydraulic pressure is supplied to the pilot port 83a, the bypass fail safe valve 83 makes the input port 83b and the output port 83c communicate with each other, so that hydraulic pressure is supplied to the electromagnetic valves SOL2 and SOL3 through the hydraulic oil paths 69e and 69f respectively. On the other hand, when the supply of hydraulic pressure to the pilot port 83a is suspended, the output port 83c is closed so that the supply of hydraulic pressure to the electromagnetic valves SOL2 and SOL3 is suspended respectively. Accordingly, when the power feeding to the electromagnetic valve SOL6 is suspended, the spool valve shaft 84 of the bypass fail safe valve 83 closes the output port 83c so that the supply of hydraulic pressure to the hydraulic oil paths 69e and 69f is suspended.

The oil path 68b connected to the output port 76b of the first shift actuator 61 is connected to the oil path 85 through a shuttle valve 86a. As a result, when the two shift actuators 61 and 62 take their neutral positions respectively, hydraulic pressure is supplied to the pilot port 83a of the bypass fail safe valve 83 from the oil path 68a through the two neutral position detecting valves 76 and 77.

A bypass oil path on-off valve 88 is provided in a bypass oil path 87 connected to the output port 83c of the bypass fail safe valve 83. This bypass oil path on-off valve 88 has a spool valve shaft 89 actuated by pilot hydraulic pressure and spring force. The oil path 85 is connected to a pilot port 88a. This bypass oil path on-off valve 88 has an input port 88b connected to the output port 83c of the bypass fail safe valve 83. The communication between this port 88b and an output port 88c is blocked when pilot pressure is supplied. On the other hand, when the supply of the pilot pressure is suspended, the spool valve shaft 89 slides due to spring force so that the input port 88b and the output port 88c are brought into communication with each other. Thus, the bypass oil path 87 is opened. In the hydraulic oil path 69e, a fail safe bypass valve 90 is provided to be located between the bypass clutch 32 and the electromagnetic valve SOL2. This fail safe bypass valve 90 has a spool valve shaft 79 actuated by pilot pressure and spring force. The fail safe bypass valve 90 has a pilot port 90a connected to the line pressure oil path 68. When pilot pressure is supplied, an input port 90b and an output port 90c are brought into communication with each other. Thus, the hydraulic oil path 69e is opened.

A bypass oil path change-over valve 91 is provided in the bypass oil path 87. A spool valve shaft 92 actuated by pilot hydraulic pressure and a spring is incorporated in this bypass oil path change-over valve 91. The bypass oil path change-over valve 91 has an input port 91a and a first output port 91b allowed to communicate with each other when pilot hydraulic pressure is not supplied. A bypass oil path 87a is connected to the first output port 91b. This bypass oil path 87a is connected to the first bypass clutch 31 through a shuttle valve 86b.

A pilot port 91c of the bypass oil path change-over valve 91 is connected to the hydraulic oil path 69e through a pilot oil path 93a. When an electric current is supplied to the electromagnetic valve SOL2 in order to couple the second bypass clutch 32, pilot pressure is supplied to the spool valve shaft 92 so that the communication between the input port 91a and the first output port 91b is blocked. At this time, the input port 91a communicates with a second output port 91d. A bypass oil path 94 is connected to this second output port 91d. This bypass oil path 94 is connected to the hydraulic oil path 69e through a shuttle valve 86c.

On the other hand, a pilot oil path 93b connected to the bypass clutch 31 is connected to a pilot port 91f formed in the bypass oil path change-over valve 91. The thrust applied to the spool valve shaft 92 by the hydraulic pressure supplied to this pilot port 91f acts inversely to the thrust applied thereto by the hydraulic pressure supplied to the pilot port 91c.

Therefore, when power feeding to the electromagnetic valve SOL6 and the electromagnetic valve SOL3 is suspended due to a failure of an electric system in the running state where the first bypass clutch 31 has been coupled by the power feeding to the electromagnetic valve SOL6 and the electromagnetic valve SOL3, the supply of hydraulic pressure to the bypass clutch 31 through the hydraulic oil path 69f is shut off. At this time, however, the spool valve shaft 82 of the fail safe valve 81 moves due to the spring force so as to close the port 81c. Thus, the supply of line pressure to the oil path 85 is cut off. As a result, the spool valve shaft 89 of the bypass oil path on-off valve 88 moves due to the spring force so as to bring the input port 88b and the output port 88c into communication with each other. Thus, the line pressure flows into the bypass oil path 87 through the bypass fail safe valve 83. This line pressure is supplied to the first bypass clutch 31 through the bypass oil path 87a because the input port 91a and the first output port 91b of the bypass oil path change-over valve 91 come in communication with each other.

On the other hand, when power feeding to the electromagnetic valve SOL6 and the electromagnetic valve SOL2 is suspended due to a failure of an electric system in the running state where the second bypass clutch 32 has been coupled by the power feeding to these electromagnetic valves, the supply of hydraulic pressure to the bypass clutch 32 through the hydraulic oil path 69e is shut off. In the same manner as above, however, the spool valve shaft 89 of the bypass oil path on-off valve 88 moves due to the spring force so as to bring the input port 88b and the output port 88c into communication with each other. Thus, oil at the line pressure flows into the bypass oil path 87 through the bypass fail safe valve 83.

In addition, when the second bypass clutch 32 is coupled, the pilot pressure is supplied to the pilot port 91c of the bypass oil path changer-over valve 91 through the pilot oil path 93a so that the second output port 91d is brought into communication with the input port 91a. Accordingly, the line pressure supplied to the bypass oil path 87 is supplied to the second bypass clutch 32 through the bypass oil path 94 connected to the second output port 91d of the bypass oil path change-over valve 91. At this time, the pilot pressure is supplied to the pilot port 91c through the bypass oil path 94 and the pilot oil path 93a so that the spool valve shaft 92 keeps the state where the second output port 91d is opened.

Thus, by providing the fail safe valve 81, the bypass oil path on-off valve 88 and the bypass oil path change-over valve 91, the change gear array before suspension of the electric conduction, that is, the third-speed gear or the sixth-speed gear is kept when the electric conduction to the electromagnetic valves is suspended in the third-speed running state where the first bypass clutch is coupled or in the sixth-speed running state where the second bypass clutch 32 is coupled. This change gear array is kept even if the driver operates the select lever to set in the neutral range and then select the drive range again. That is, even when the electric conduction to the electromagnetic valves is suspended during the sixth-speed running, the pilot pressure is kept applying to the pilot port 91c of the bypass oil path change-over valve 91 if the engine is driven. Thus, the output port 91d keeps open so that the second bypass clutch 32 keeps its coupling mode. Accordingly, there is no fear of shift change from the sixth speed to the third speed even if there occurs a failure in the electric system during running in the sixth-speed. Incidentally, also when the neutral range is selected, the supply of hydraulic pressure to the input clutch 17 is kept through the neutral position detecting valves 76 and 77.

On the other hand, when a fail mode valve 95 is provided as shown in FIG. 4, the vehicle can be moved reversely in response to the selection of the reverse range by the select lever even when the electric conduction to the electromagnetic valves is suspended due to a failure of the electric system. Further, when the drive range is selected again by the select lever after the reverse range is once selected, limp-home control is carried out so that the first bypass clutch 31 is coupled to transmit the power through the third-speed change gear array independently of the state of the change gear array before suspension of the electric conduction.

This fail mode valve 95 has a spool valve shaft 96 actuated by pilot pressure and spring force. The oil path 85 is connected to a pilot port 95a. Further, the fail mode valve 95 has an output port 95c allowed to communicate with the input port 95b when pilot pressure is not supplied to the pilot port 95a. This output port 95c is connected to a pressure port 91e communicating with the spring chamber of the bypass oil path change-over valve 91 through an oil path 97a. In addition, this oil path 97a is connected to a neutral position setting oil path 97b through a shuttle valve 86d. This neutral position setting oil path 97b is connected to respective ports of the first and second shift actuators 61 and 62 through corresponding shuttle valves 86e to 86h.

The spool valve shaft 96 of the fail mode valve 95 has valve bodies 96a and 96b with an area A1 to receive pressure, and valve bodies 96c to 96e with a larger area A2 than the area A1 to receive pressure. Accordingly, thrust of $A_1 \cdot P_L + (A_2 - A_1) P_L$ is applied to the spool valve shaft 96 rightward in FIG. 4, while thrust of $kl + (A_2 - A_1) P_{mr}$ is applied thereto leftward. Here, k designates a spring constant, l designates a spring displacement, $P_L$ designates pressure applied to the pilot port 95a, the input port 95b and the output port 95c, and $P_{mr}$ designates pressure applied to a pilot port 95d.

When the reverse range is selected by the select lever so that the spool valve shaft 66 of the manual valve 67 is operated to take an R position, the line pressure is supplied to the piston 63a of the reverse servo valve 63 through the oil path 78. Consequently, the piston rod 63b is driven to an R position to bring the synchro-sleeve 43a into engagement with the spline 49b. At this time, an output port 63e provided in the reverse servo valve 63 comes into communication with the line pressure port 67a so that the line pressure is supplied to the output port 63e.

This output port 63e is connected to the pilot port 95d of the fail mode valve 95 through an oil path 98. Thrust inverse to the thrust caused by the hydraulic pressure supplied to the pilot port 95a is applied to the spool valve shaft 96 by the hydraulic pressure supplied to this pilot port 95d. When the hydraulic pressure is supplied to the pilot port 95d, the spool valve shaft 96 of the fail mode valve 95 slides leftward in FIG. 4 due to the area difference between the valve body 96a and the valve body 96e and the spring force, so that the output port 95c and the input port 95b communicate with each other. The output port 95c is brought into communication with the respective ports 61a, 61b, 62a and 62b of the respective shift actuators 61 and 62 through the oil paths 97a and 97b. Thus, both the shift actuators 61 and 62 keep their neutral states.

When both the shift actuators 61 and 62 become neutral, the neutral position detecting valves 76 and 77 are brought into communication with each other so that the hydraulic pressure is supplied to the hydraulic oil path 85 through the oil path 68b while the hydraulic pressure is supplied to the pilot port 83a of the bypass fail safe valve 83. In addition, since the output port 63e of the reverse serve valve 63 is connected to the port 83b of the bypass fail save valve 83 through the oil path 98 and the hydraulic oil path 69, the hydraulic pressure is supplied to this port 83b.

Consequently, the hydraulic pressure from the reverse servo valve 63 is supplied to the first bypass clutch 31 through the bypass oil path on-off valve 88 and the bypass oil path change-over valve 91 so that the bypass clutch 31 is brought into the coupling mode. Accordingly, first, since the input clutch 17 and the bypass clutch 31 are coupled after the change gear array is shifted to the reverse range by the reverse servo valve 63, it is possible to prevent the production of gear chatter, and it is possible to move the vehicle reversely even if there occurs a failure in the electric system. Further, at this time, the fail safe valve 74 for the input clutch blocks the hydraulic oil path 69. Thus, the input clutch 17 is coupled only when both the shift actuators 61 and 62 take their neutral positions. Incidentally, the reverse servo valve 63 is provided with a discharge port 63f for discharging the oil in the oil chamber through a throttled portion when the piston rod 63b takes the D position.

On the other hand, even if there occurs a failure in the electric system, when the select lever is operated to select the drive range from the reverse range via the neutral range, the first bypass clutch 31 is coupled so as to allow running in the third speed. That is, when the select lever is operated to select the neutral range, the spool valve shaft 66 of the manual valve 67 is interlocked to close the D port 67b. As a result, the supply of hydraulic pressure to the hydraulic oil path 69 is suspended so that the supply of hydraulic pressure to the bypass clutch 31 is blocked.

Next, when the select lever is operated to select the drive range, the spool valve shaft 66 of the manual valve 67 is interlocked to open the D port 67b so that the piston rod 63b moves reversely to the D position due to the hydraulic pressure supplied from the D port 63c to the reverse servo valve 63 through the hydraulic oil path 69. As a result, the synchro-sleeve 43a engages with the spline 49a so that the third-speed change gear array is brought into the power transmission mode. Concurrently, the hydraulic pressure flowing in the bypass oil path 87 is supplied to the input port 91a of the bypass oil path change-over valve 91 through the bypass fail safe valve 83 and the bypass oil path on-off valve 88. The supplied hydraulic pressure is supplied to the bypass clutch 31 through the bypass oil path 87a. Accordingly, even if the electric conduction to the respective electromagnetic valves is suspended due to a failure of the electric system, when the select level is shifted from the reverse range to the drive range, the bypass clutch 31 is actuated to set the third-speed gear stage so that the vehicle can be driven. Even when the drive range is selected to be shifted from the neutral range after the engine is suspended in the state where the power feeding to the electromagnetic valves is suspended due to a failure of the electric system, the third-speed gear stage is set similarly.

Since the fail mode valve 95 is provided in such a manner, the running in the third-speed gear stage can be allowed on the occasion where a failure occurs in the electric system, if the select lever is operated to select the reverse range and then select the drive range again. Incidentally, FIG. 4 shows the state where pilot pressure is supplied to the fail safe valve 81, the bypass fail safe valve 83, the bypass oil path on-off valve 88 and the fail mode valve 95 while the pilot pressure is not supplied to the pilot port of the bypass oil path change-over valve 91.

Figure 5:
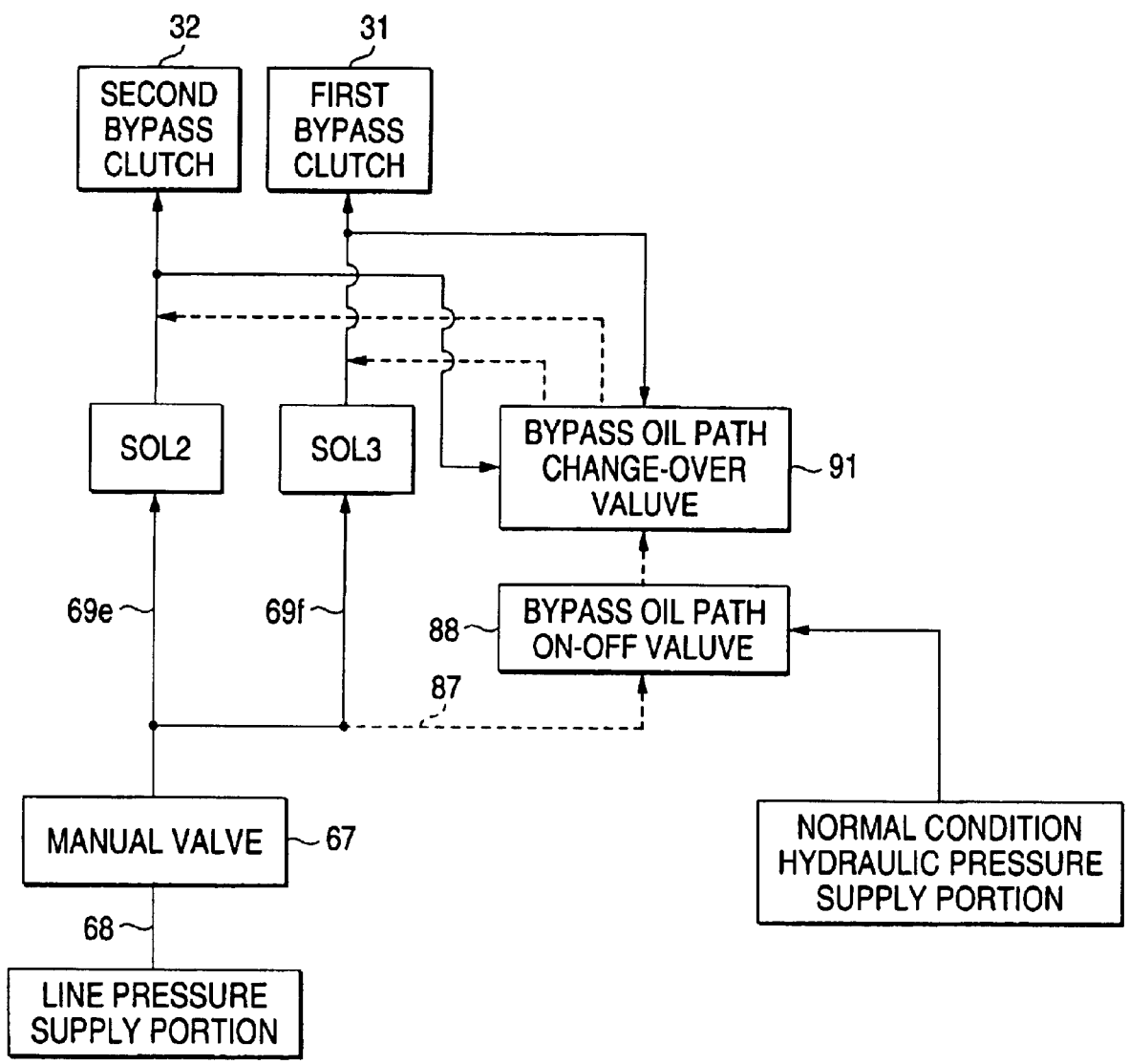
FIG. 5 is a hydraulic circuit diagram schematically showing a main portion of the hydraulic control system.
Figure 6:
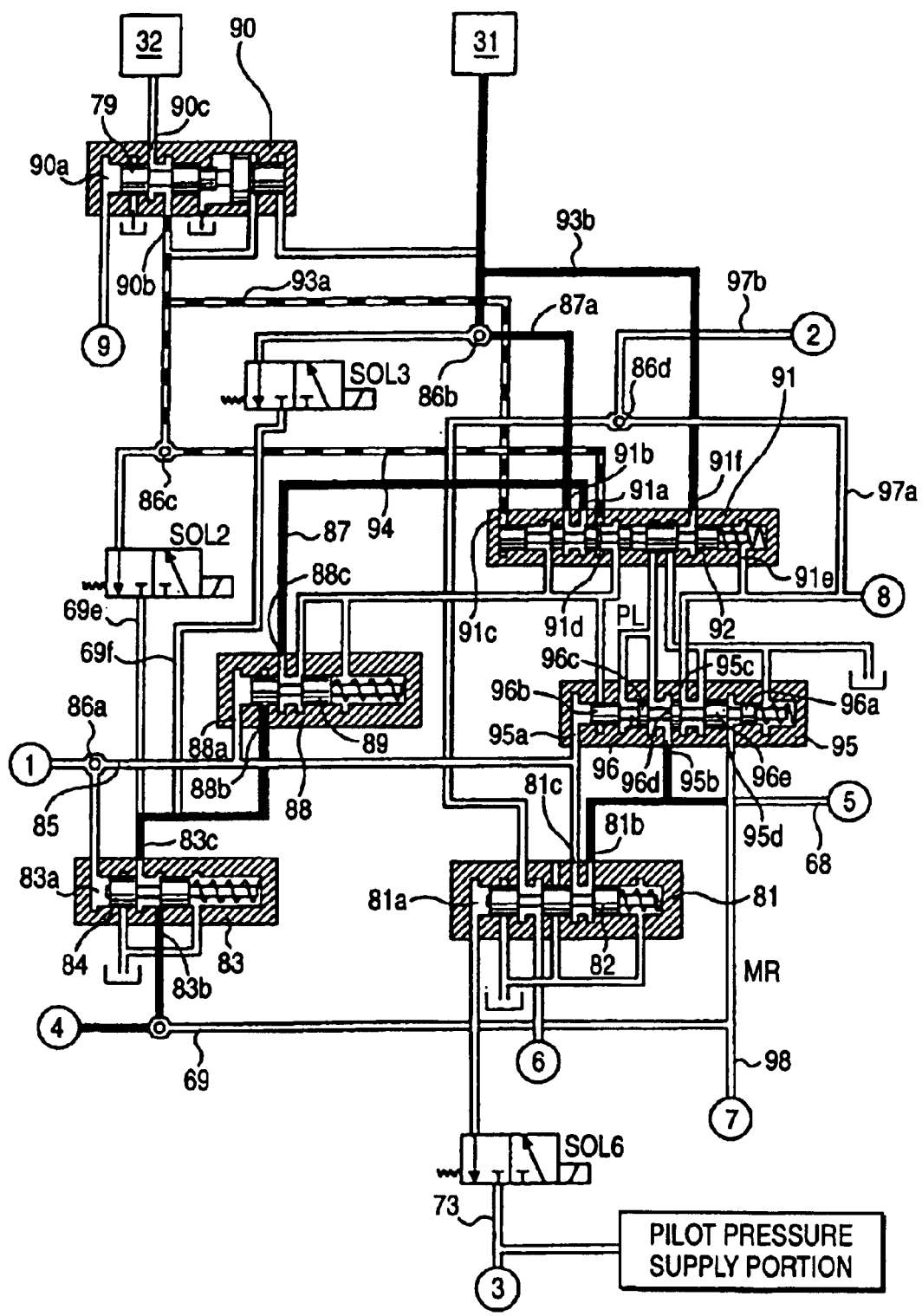
FIG. 6 is a hydraulic circuit diagram showing the same portion as that in FIG. 4, in the state where a fail safe has been actuated.

FIG. 5 is a hydraulic circuit diagram schematically showing a main portion of the hydraulic circuit shown in FIGS. 3 and 4. FIG. 6 is a hydraulic circuit diagram showing the same portion as that shown in FIG. 4 in the state where the fail safe has been actuated in response to a failure of the electric system. The pressure discharged from an oil pump and adjusted by a line pressure supply portion is supplied to the line pressure oil path 68. When the driver operates the select lever so as to select the drive range, the manual valve 67 makes the line pressure oil path 68 communicate with the hydraulic oil path 69. The two bypass clutches 31 and 32 are connected to the D port of the manual valve 67 through the hydraulic oil paths 69e and 69f respectively. In the steady-state condition, the supply and discharge of the hydraulic pressure to and from the bypass clutches 31 and 32 are controlled by the on and off operations of the electromagnetic valves SOL2 and SOL3 respectively.

The bypass clutches 31 and 32 are connected to the D port of the manual valve 67 through the bypass oil path 87 separated from the hydraulic oil paths 69e and 69f, respectively. When there occurs a failure in the electric system so that electric conduction to the electromagnetic valves for the respective bypass clutches 31 and 32 cannot be established, the supply of pilot pressure to the bypass oil path on-off valve 88 is suspended. Thus, the bypass oil path on-off valve 88 opens the bypass oil path 87. The hydraulic pressure from the bypass oil path 87 through the bypass oil path on-off valve 88 is supplied to the bypass clutch 31, 32. Then, pilot pressure is applied to the bypass oil path change-over valve 91 so as to keep the change-over mode of hydraulic pressure to a bypass clutch which has been coupled in the steady-state condition. Accordingly, at the time of a failure in the electric system, hydraulic pressure is supplied to the bypass clutch which has been supplied before the failure. Thus, at the time of the failure, the gear stage before the failure is kept so that sudden speed reduction is prevented from occurring.

In FIG. 6, the black thick lines designate the state where hydraulic pressure is supplied to the first bypass clutch 31 on a failure occasion, and the black broken lines designate the state where hydraulic pressure is supplied to the second bypass clutch 32.

Figure 7:
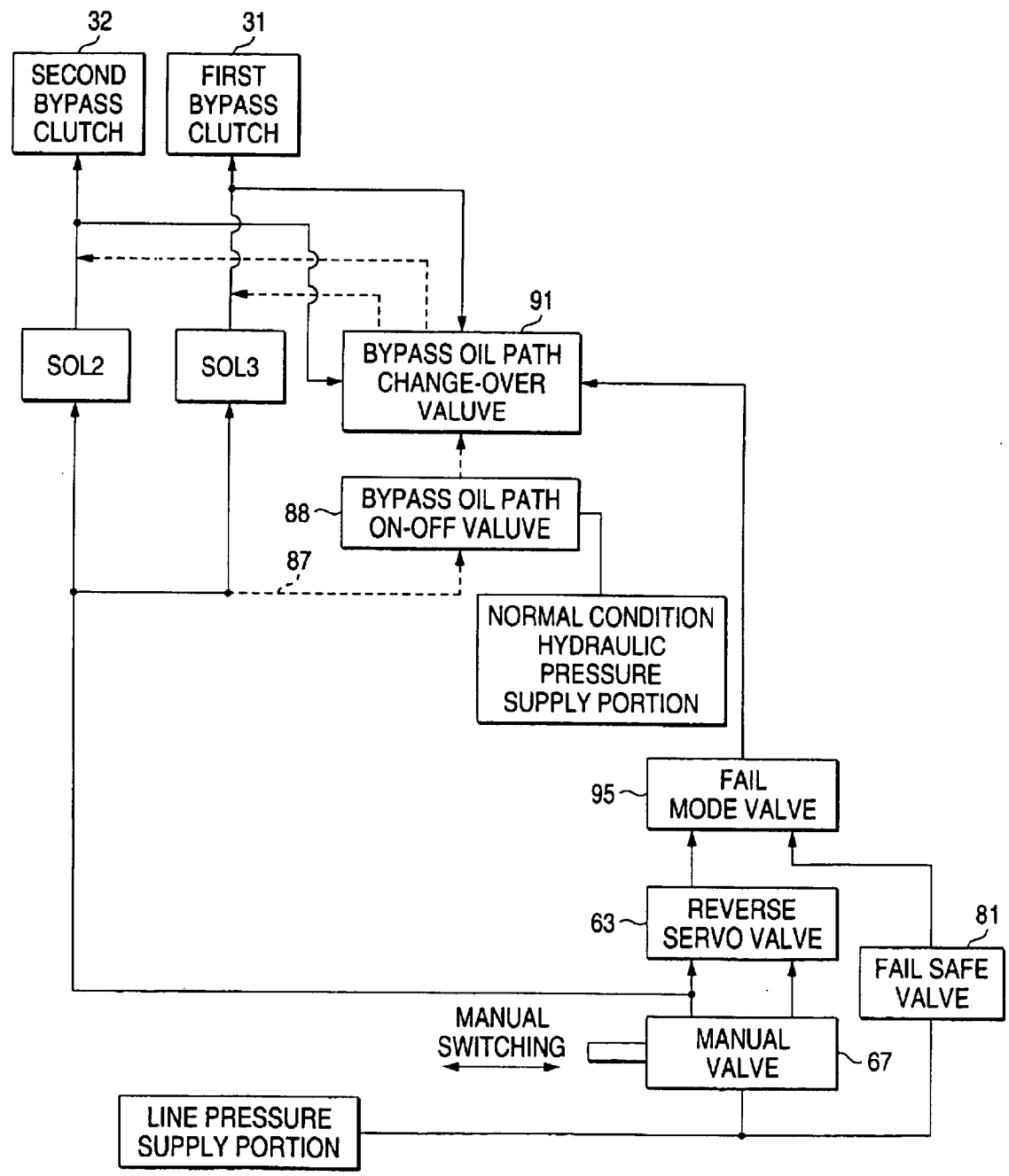
FIG. 7 is a hydraulic circuit diagram schematically showing a main portion of the hydraulic control system.
Figure 8:
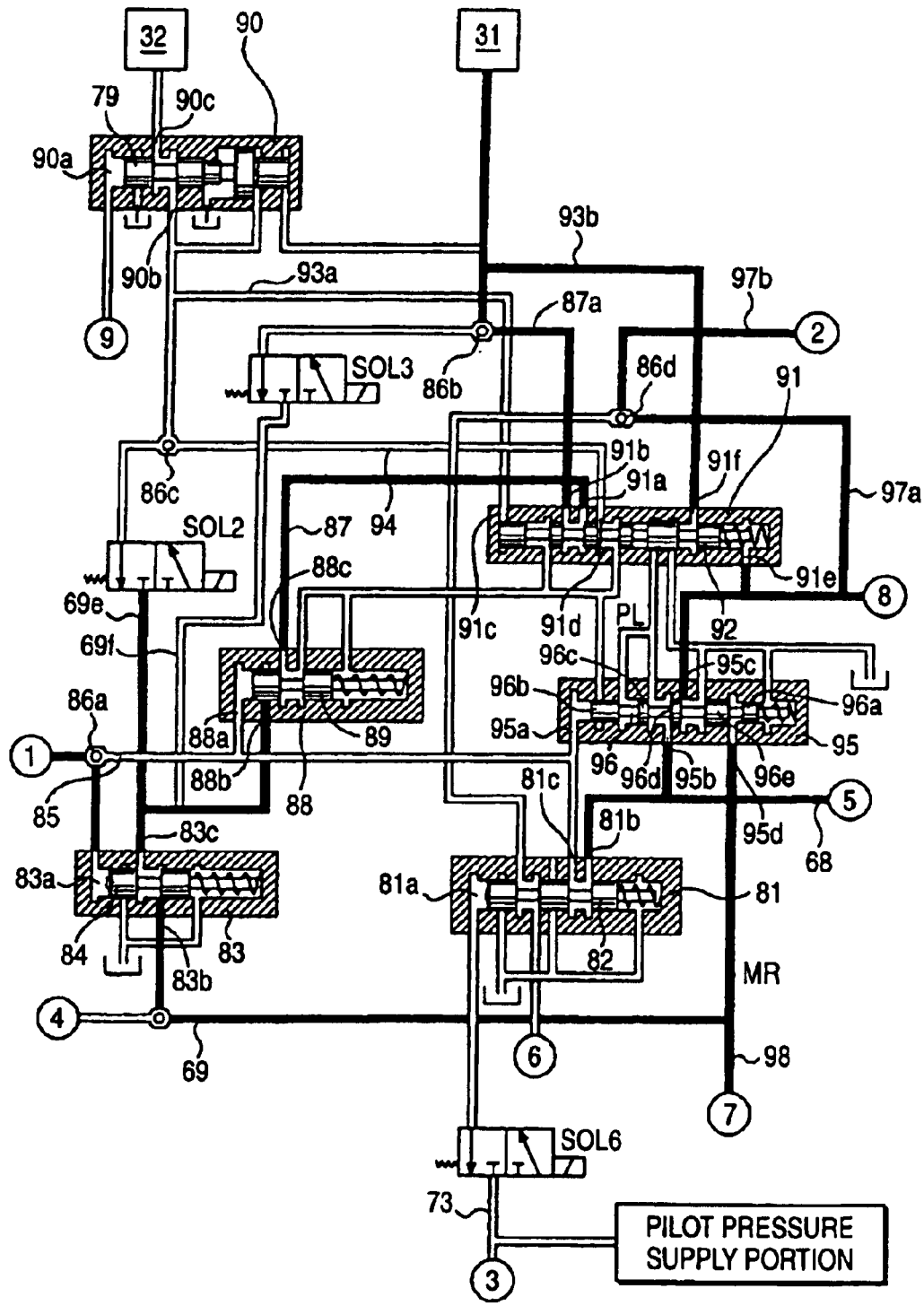
FIG. 8 is a hydraulic circuit diagram showing the same portion as that in FIG. 4, in the state where the fail safe has been actuated in response to a failure of an electric system.
Figure 9:
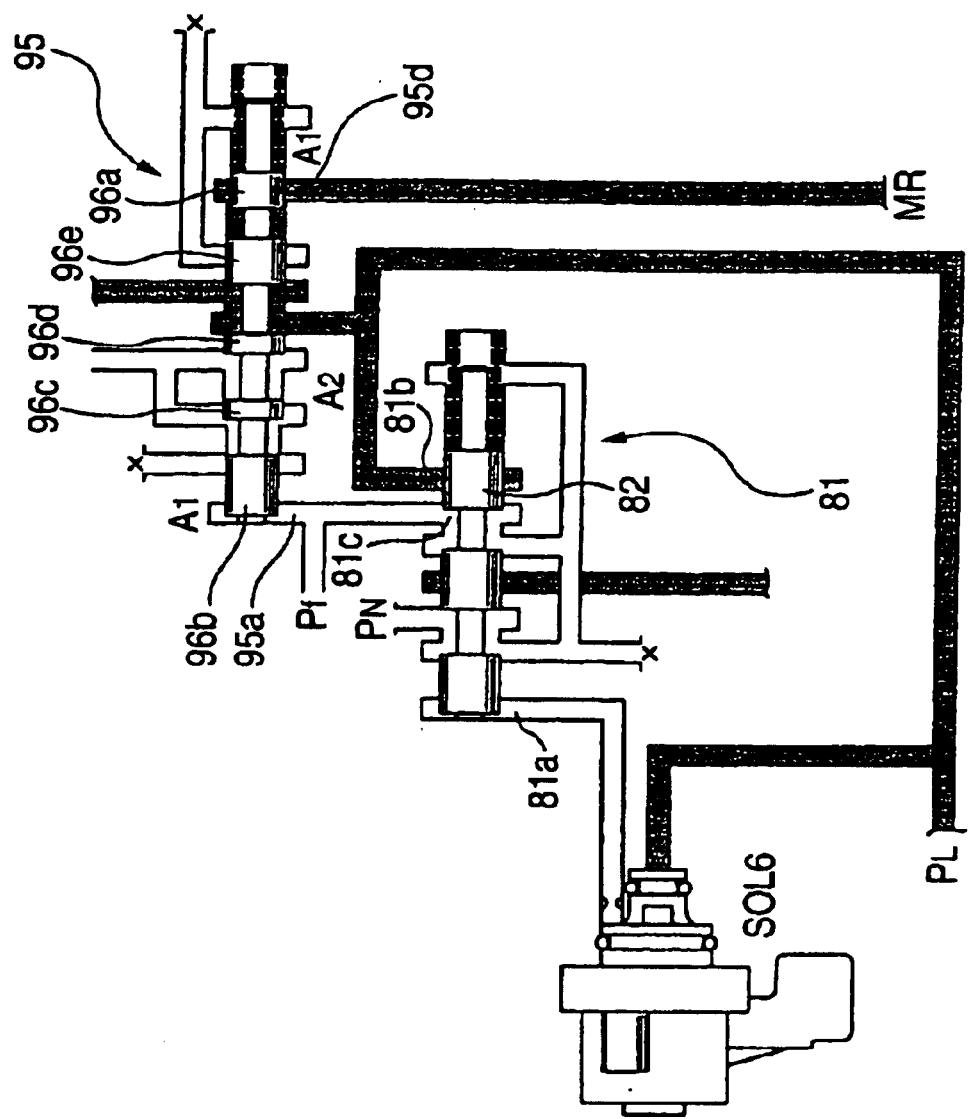
FIG. 9 is a hydraulic circuit diagram showing a fail safe valve and a fail mode valve of FIG. 8 in a magnified form.

FIG. 7 is a hydraulic circuit diagram schematically showing a main portion of the hydraulic circuit shown in FIGS. 3 and 4. FIG. 8 is a hydraulic circuit diagram showing the same portion as that in FIG. 4, in the state where the fail safe has been actuated in response to a failure of the electric system. FIG. 9 is a hydraulic circuit diagram showing the fail safe valve 81 and the fail mode valve 95 of FIG. 8 in a magnified form. When there occurs a failure in the electric system, the power feeding to the electromagnetic valve SOL6 is suspended so that the supply of the pilot pressure to the pilot pressure port 81a of the fail safe valve 81 is suspended. Thus, the supply of the pilot pressure to the pilot port 95a of the fail mode valve 95 is suspended. Concurrently with this suspension, the supply of the pilot pressure to the bypass oil path on-off valve 88 is also suspended so that the bypass oil path 87 is opened.

When the select lever is operated to select the reverse range in this condition, hydraulic pressure is supplied to the reverse serve valve 63 through the manual valve 67 so that the piston rod 63b of the reverse servo valve 63 takes the R position. Consequently, the hydraulic pressure is supplied to the pilot port 95d of the fail mode valve 95 through the oil path 98 so that the input port 95b of the fail mode valve 95 communicates with the output port 95c. Accordingly, the pilot pressure is supplied to the pilot port 91e of the bypass oil path change-over valve 91 so that the hydraulic pressure from the bypass oil path 87 is supplied to the first bypass clutch 31. Thus, even if there occurs a failure in the electric system, the vehicle can be moved reversely.

Next, when the select lever is operated to select the drive range, the piston rod 63b of the reverse servo valve 63 operates so that the synchro-sleeve 43a engages with the third-speed driving gear 23a. Thus, the vehicle is allowed to run in the third-speed gear stage. In such a manner, on the failure occasion, by the switching of the manual valve 67, not only is it possible to move the vehicle reversely but it is also possible to drive the vehicle in the third speed.

In FIGS. 8 and 9, the black thick lines designate oil paths in which hydraulic pressure acts when the reverse range is selected.

Figure 10:
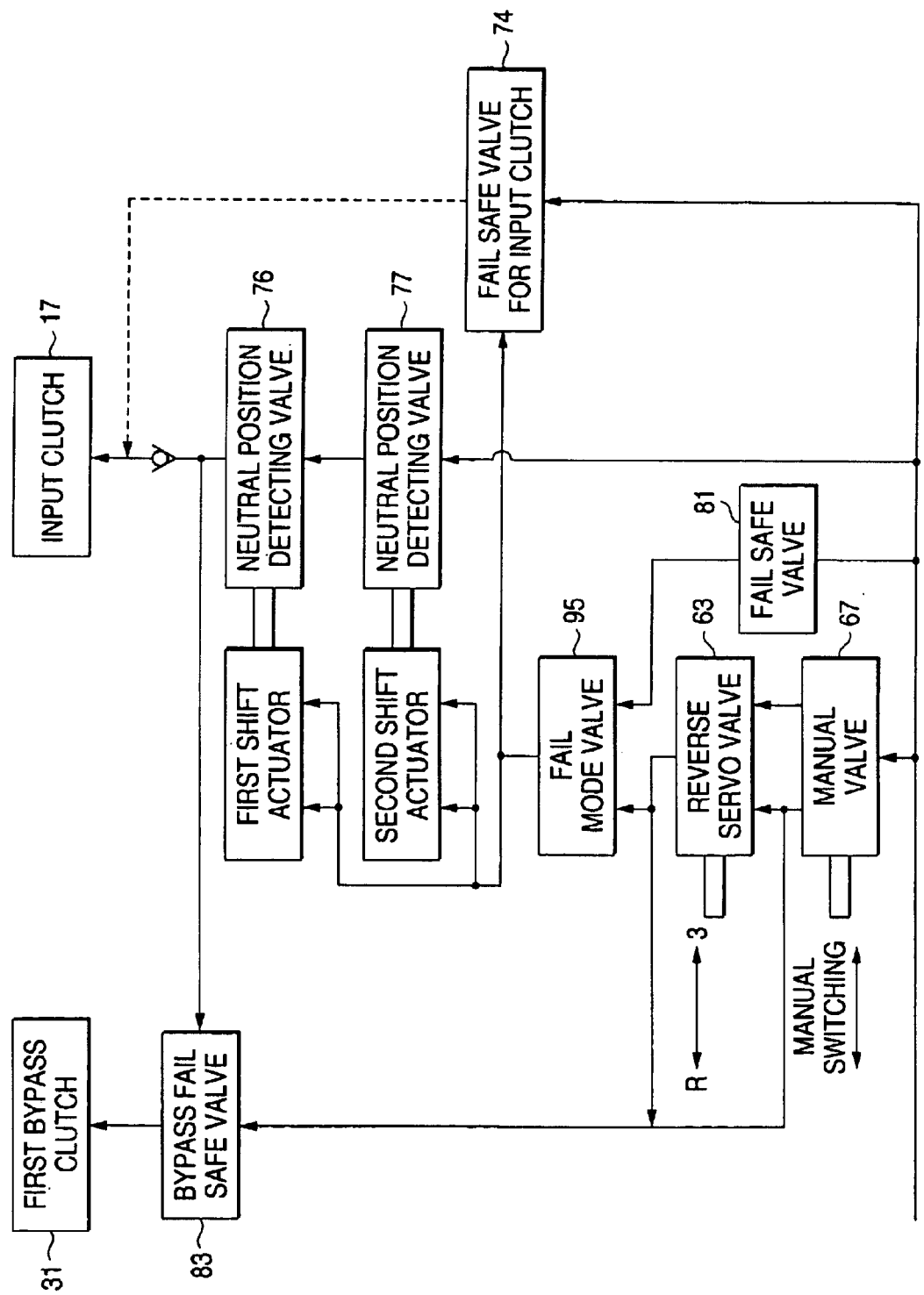
FIG. 10 is a hydraulic circuit diagram schematically showing a main portion of the hydraulic control system.
Figure 11:
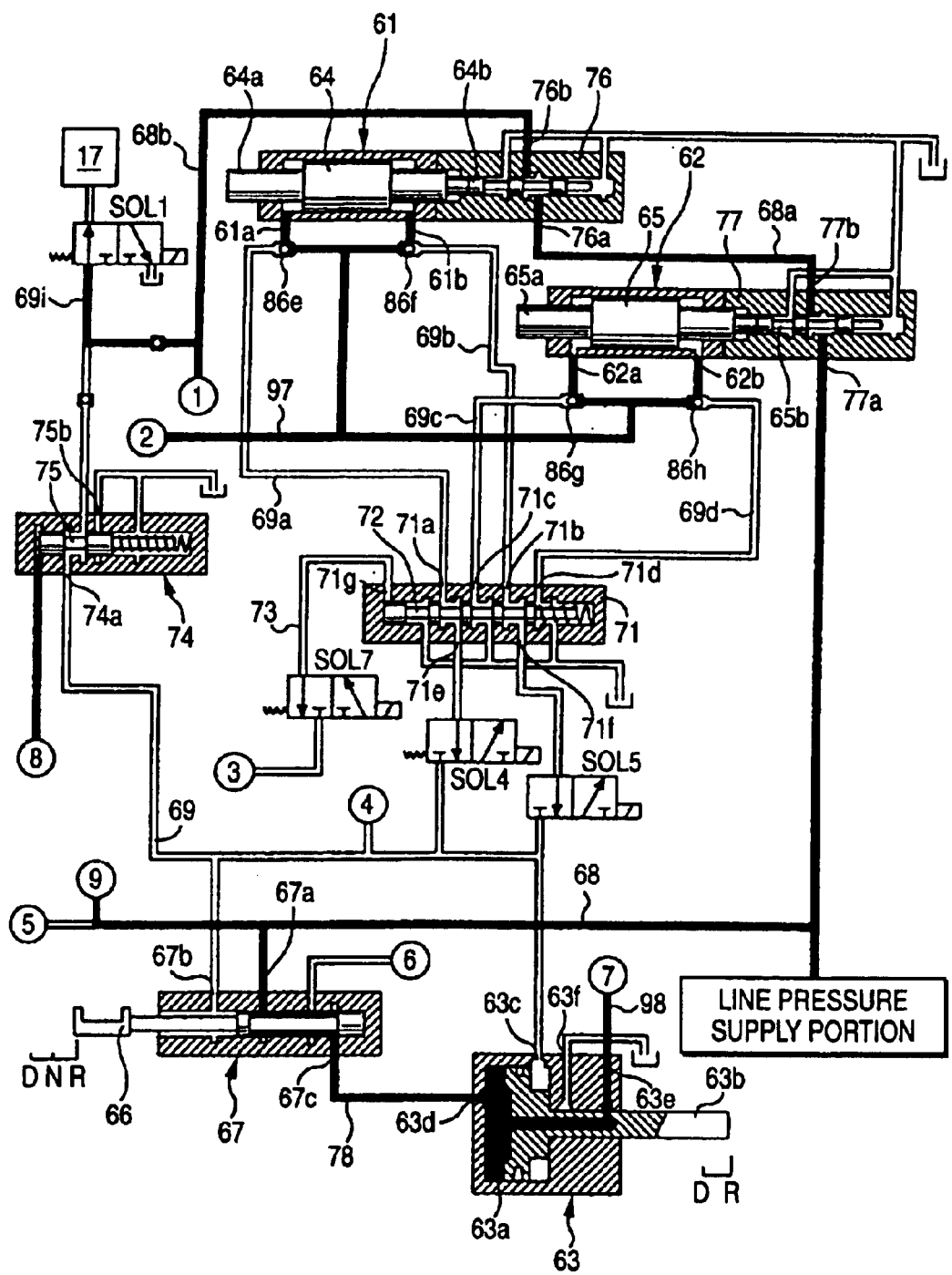
FIG. 11 is a hydraulic circuit diagram showing a portion similar to that in FIG. 3, in the state where a fail safe has been actuated in response to a failure of an electric system.

FIG. 10 is a hydraulic circuit diagram schematically showing a portion of the hydraulic circuit shown in FIGS. 3 and 4. FIG. 11 is a hydraulic circuit diagram showing a portion similar to that in FIG. 3, in the state where the fail safe has been actuated in response to a failure of the electric system. On a failure occasion, the supply of the pilot pressure to the pilot pressure port 81a of the fail safe valve 81 is suspended. Thus, the supply of the pilot pressure to the pilot port 95a of the fail mode valve 95 is suspended. When the select lever is operated to select the reverse range in this condition, hydraulic pressure is supplied from the manual valve 67 to the reverse servo valve 63 so that the piston rod 63b of the reverse servo valve 63 takes an R position as shown in FIG. 11. As a result, the hydraulic pressure is supplied to the pilot port 95d of the fail mode valve 95 through the oil path 98 so that the input port 95b of the fail mode valve 95 communicates with the output port 95c.

The hydraulic pressure discharged from the output port 95c is supplied to the input ports of the respective shift actuators 61 and 62 through the neutral position setting oil paths 97a, 97b and 97 so that both the shift actuators 61 and 62 take their neutral positions. When the shift actuators 61 and 62 take the neutral positions, hydraulic pressure is supplied to the input clutch 17 through the oil path 68b so that the input clutch 17 couples the engine with the input shaft 11.

Further, the pilot pressure is supplied to the pilot port 91e of the bypass oil path change-over valve 91 while the hydraulic pressure from the bypass oil path 87 is supplied to the first bypass clutch 31. Thus, since shifting to the reverse range is carried out before the input clutch 17 or the bypass clutch 31 is coupled, it is possible to prevent gear chatter.

The present invention is not limited to the embodiment. Not to say, various modifications can be made in the present invention without departing from the spirit and scope of the present invention. For example, although the clutch drums of the two bypass clutches 31 and 32 are integrated with each other in the embodiment, they may be separated. One of the bypass clutches may be provided on the input shaft 11 while the other bypass clutch is provided on the output shaft. The two bypass clutches may be attached coaxially in the axial direction. Although synchro-mesh mechanisms are used as the change gear array switching mechanisms 41 to 43 in the embodiment, dog clutch switches or the like may be used. Although there are provided ahead six stages in the illustrated embodiment, any desirable number of gear stages may be formed. Although the illustrated automated manual transmission is applied to a four-wheel-drive vehicle, the present invention is also applicable to FF vehicles or FR vehicles. The automated manual transmission may be placed vertically or horizontally in an engine room.

Further, although the two bypass clutches 31 and 32 are provided in the embodiment of the present invention, only one bypass clutch may be provided. In this case, the bypass oil path change-over valve 91 may be omitted so that an oil path is connected directly from the bypass oil path on-off valve 88 to the bypass clutch.

According to the present invention, even if the operations of electromagnetic valves for changing over among gear stages are suspended due to a failure of an electric system in an AMT having a plurality of bypass clutches, a bypass clutch corresponding to a predetermined gear stage which has been set on the normal condition is coupled so that the vehicle can be driven while keeping the gear stage at the time of normal running. It is therefore possible to prevent sudden speed reduction from occurring in the vehicle at the time of a failure.

According to the present invention, in an automated manual transmission in which an input shaft and an output shaft are coupled and uncoupled in predetermined gear stages by a plurality of bypass clutches, when there occurs a failure in an electric system, a bypass oil path change-over valve operates to guide hydraulic pressure to a bypass clutch corresponding to a specific gear stage. Accordingly, even on the occasion of the failure of the electric system, the vehicle is allowed to run ahead. When the bypass clutch supplied with the hydraulic pressure is set on the lower speed stage side, the vehicle can run more smoothly.

According to the present invention, when the select lever is operated to select the reverse range on a failure occasion, a change gear array for the reverse comes into engagement so that hydraulic pressure is supplied to the bypass clutch. Further, the shift actuator for shifting the change gear array is switched to a neutral position by the fail mode valve. Thus, the vehicle can be moved reversely even on the failure occasion.

Further, when the shift actuator takes the neutral position, hydraulic pressure is supplied to the input clutch through the neutral position detecting valve so that the input clutch is coupled. Thus, the change gear array for the reverse comes into engagement before the input clutch is coupled. It is therefore possible to prevent gear chatter from occurring.

According to the present invention, on a failure occasion where there occurs a failure in an electric system, when a select lever is operated to select a drive range from a reverse range or a neutral range, an input shaft and an output shaft are coupled by a bypass clutch so that one gear stage is established. Further, after shift actuators take their neutral positions, hydraulic pressure is supplied to an input clutch so that the input clutch is coupled. In such a manner, the input clutch is coupled only when the shift actuators take the neutral positions. Thus, the vehicle can be driven even on the failure occasion.

What is claimed is:

1. A hydraulic control system of an automated manual transmission having an input shaft with a plurality of drive gears, an output shaft with a plurality of driven gears engaging with the drive gears in accordance with drive conditions and to transmit power from an engine to a wheel drive shaft via the drive and driven gears, the transmission comprising:

a shift actuator for shifting a change gear array and for transmitting the power from the input shaft to the output shaft;

a plurality of bypass clutches for coupling and for uncoupling a connection between the input shaft and the output shaft respectively;

a plurality of electromagnetic valves provided in a plurality of hydraulic oil paths for guiding a hydraulic pressure from a hydraulic pressure supply portion to the respective bypass clutches to open and to close the corresponding hydraulic oil paths, respectively;

a bypass valve provided in a bypass oil path for bypassing the respective hydraulic oil paths for opening the bypass oil path to maintain a current gear ratio when one of the plurality of electromagnetic valves that provide the hydraulic pressure to the respective bypass clutches are inoperative due to a failure in an electric system, wherein said output shaft is substantially parallel to and axially displaced from said input shaft; and a fail mode valve that allows the hydraulic pressure to be supplied to at least one of the plurality of bypass clutches to enable a reverse mode to be engaged when a reverse range is selected by an operation of a select lever during the failure in the electric system.

2. The hydraulic control system of claim 1, further comprising:

a bypass change valve adapted to be changed over to supply said hydraulic pressure from the bypass valve to the bypass clutches.

3. The hydraulic control system of claim 2, wherein:

the bypass change valve changes over to a position to supply the hydraulic pressure to one of the bypass clutches when the failure occurs, while the bypass change valve is brought into a switching mode by using the hydraulic pressure from the hydraulic oil path as a pilot pressure when the hydraulic pressure from the hydraulic oil path is supplied to another one of the bypass clutches on a normal occasion of the electric system, and a switching mode is maintained also when the failure occurs.

4. The hydraulic control system of claim 2, further comprising:

a fail safe valve for changing over between a discharge of the pilot pressure and a delay of the discharge in accordance with a normal occasion and when the failure occurs; and a reverse servo valve for the discharging said hydraulic pressure when a reverse range is selected by an operation of a select lever, wherein said fail mode valve actuates the bypass change valve so as to supply the hydraulic pressure to a specific one of the bypass clutches when the fail safe valve detects the failure while the hydraulic pressure is supplied from the reverse servo valve.

5. The hydraulic control system of claim 4, wherein the fail mode valve supplies the hydraulic pressure to the bypass change valve when the engine is suspended during the failure.

6. A hydraulic control system of an automated manual transmission having an input shaft with a plurality of drive gears, an output shaft with a plurality of driven gears engaging with the drive gears in accordance with drive conditions and to transmit power from an engine to a wheel drive shaft via the drive and driven gears, the transmission comprising:

a shift actuator for shifting a change gear array and for transmitting the power from the input shaft to the output shaft;

a bypass clutch for coupling and for uncoupling a connection between the input shaft and the output shaft;

a reverse servo valve for switching the automated manual transmission to one of a forward stage and a reverse stage in accordance with an operation of a select lever, the reverse servo valve for supplying the hydraulic pressure when the automated manual transmission is switched to the reverse stage; and a fail mode valve for supplying the hydraulic pressure to the shift actuator to set the shift actuator in a neutral position when the hydraulic pressure is supplied from the reverse servo valve when a failure occurs in an electric system, wherein the hydraulic pressure is supplied from the reverse servo valve to the bypass clutch.

7. A hydraulic control system of an automated manual transmission having an input shaft with a plurality of drive gears, an output shaft with a plurality of driven gears engaging with the drive gears in accordance with drive conditions and to transmit power from an engine to a wheel drive shaft via the drive and driven gears, the transmission comprising:

a shift actuator for shifting a change gear array and for transmitting power from the input shaft to the output shaft;

an input clutch for coupling and for uncoupling a connection between the engine and the input shaft;

a bypass clutch for coupling and for uncoupling a connection between the input shaft and the output shaft;

a reverse servo valve for switching to one of a forward stage and a reverse stage in accordance with an operation of a select lever, the reverse servo valve for supplying hydraulic pressure when the automated manual transmission is switched to the reverse stage;

a fail mode valve for supplying the hydraulic pressure to the shift actuator to set the shift actuator in a neutral position when the hydraulic pressure is supplied from the reverse servo valve when a failure occurs in an electric system; and a neutral position detecting valve for supplying the hydraulic pressure for coupling to the input clutch when the shift actuator takes a neutral position, wherein the hydraulic pressure supplied from the neutral position detecting valve is supplied to the input clutch while the hydraulic pressure supplied from the reverse servo valve is supplied to the bypass clutch.

8. A hydraulic control system of an automated manual transmission having an input shaft with a plurality of drive gears, an output shaft with a plurality of driven gears engaging with the drive gears in accordance with drive conditions and to transmit power from an engine to a wheel drive shaft via the drive and driven gears, the transmission comprising:
- an input clutch for coupling and for uncoupling a connection between the engine and the output shaft;
- a plurality of shift actuators for shifting a change gear array and for transmitting power from the input shaft to the output shaft;
- a fail mode valve for supplying a hydraulic pressure to the shift actuators so that the shift actuators take neutral positions when a failure occurs in an electric system; and
- neutral position detecting valves for supplying the hydraulic pressure from a hydraulic pressure supply portion to the input clutch when the shift actuators take the neutral positions,
wherein the hydraulic pressure is supplied to the input clutch through the neutral position detecting valves.

9. The hydraulic control system of claim 8, further comprising a fail safe valve for the input clutch in an oil path for supplying the hydraulic pressure to the input clutch when the electric system operates normally, wherein the fail safe valve blocks the oil path in accordance with the hydraulic pressure from the fail mode valve when the failure occurs.

10. An automated manual transmission comprising:
- an input shaft having a plurality of driving gears;
- an output shaft having a plurality of driven gears engaging the driving gears;
- a shift actuator, wherein said shift actuator operates a gear change array, wherein said gear change array shifts between the engaged gears;
- a plurality of bypass clutches, wherein said plurality of bypass clutches couple and uncouple a connection between the output shaft to said input shaft;
- a plurality of electromagnetic valves controlled by an electric system and positioned in a plurality of hydraulic oil paths, wherein said plurality of electromagnetic valves provide hydraulic pressure from a hydraulic pressure supply portion to the plurality of bypass clutches;
- a bypass valve, wherein said bypass valve bypasses the hydraulic oil paths to provide the hydraulic pressure to the plurality of bypass clutches to maintain a current gear ratio when one of the plurality of electromagnetic valves is inoperable, wherein said one of the plurality of electromagnetic valves provides the hydraulic pressure to the plurality of bypass clutches, wherein said output shaft is substantially parallel to and axially displaced from said input shaft; and
- a fail mode valve that allows the hydraulic pressure to be supplied to at least one of the plurality of bypass clutches to enable a reverse mode to be engaged when a reverse range is selected by an operation of a select lever when one of the plurality of electromagnetic valves is inoperable.

11. The transmission of claim 10, further comprising:
a bypass change valve that supplies the hydraulic pressure from the bypass valve to the plurality of bypass clutches.

12. The transmission of claim 11, wherein the bypass change valve supplies hydraulic pressure when the electric system fails.

13. The transmission of claim 12, wherein said bypass change valve supplies the hydraulic pressure to the same one of the plurality of said bypass clutches that was supplied by the plurality of hydraulic valves prior to an electric system failure.

14. The transmission of claim 12, further comprising:
- a fail safe valve, wherein said fail safe valve discharges pilot pressure when said electric system fails; and
- a reverse servo valve, wherein said reverse servo valve discharges said hydraulic pressure when a reverse range is selected by a select lever, wherein said fail mode valve actuates said bypass change valve to supply hydraulic pressure to one of said plurality of said bypass clutches when said fail safe valve discharges said pilot pressure from said fail mode valve when said hydraulic pressure is supplied from said reverse servo valve.

15. The transmission of claim 14, wherein said fail mode valve supplies hydraulic pressure to the bypass change valve during the electric system failure.

16. The transmission of claim 14, wherein said fail mode valve supplies the hydraulic pressure to the shift actuator to place the shift actuator into a neutral position when the hydraulic pressure is supplied to the fail mode valve from the reverse servo valve.

17. The transmission of claim 14, wherein said reverse servo valve provides the hydraulic pressure to said one of the plurality of the bypass clutches via the bypass oil path change-over valve when a reverse range is selected by a select lever.

18. The transmission of claim 10, further comprising:
- an input clutch, wherein said input clutch couples and uncouples an engine to the input shaft; and
- a neutral position detecting valve, wherein the neutral position detecting valve supplies hydraulic pressure to the input clutch to couple the input shaft to the engine when the shift actuator is in a neutral position.

19. A method for operating an automated manual transmission having an input shaft with a plurality of drive gears, an output shaft with a plurality of driven gears engaging the drive gears and a plurality of electromagnetic valves in a plurality of hydraulic oil paths, wherein said plurality of said hydraulic oil paths guide hydraulic pressure from a hydraulic pressure supply portion to a plurality of bypass clutches, wherein said plurality of said bypass clutches couple and uncouple a connection between the output shaft to the input shaft, the method comprising:
- bypassing the plurality of electromagnetic valves to maintain a current gear ratio when one of the plurality of electromagnetic valves is inoperable due to failure of an electrical system, wherein said one of the plurality of said electromagnetic valves provides the hydraulic pressure to the plurality of said bypass clutches, wherein said output shaft is substantially parallel to and axially displaced from said input shaft; and
- providing a reverse mode when a reverse range is selected by a select lever during said failure of the electrical system.

20. The method of claim 19, wherein said bypassing supplies said hydraulic pressure to the same one of the plurality of said bypass clutches, wherein said same one of said plurality of said bypass clutches was supplied by the plurality of hydraulic valves prior to an electric system failure.

21. The method of claim 19, further comprising supplying the hydraulic pressure to at least one of the plurality of bypass clutches through a bypass change valve when the engine is suspended during said failure of the electrical system.

22. The method of claim 19, further comprising supplying said hydraulic pressure to a shift actuator to set the shift actuator in a neutral position.

23. The method of claim 22, wherein said supplying said hydraulic pressure to a shift actuator to set the shift actuator in a neutral position is in response to hydraulic pressure supplied from a reverse servo valve.

24. The method of claim 23, further comprising supplying the hydraulic pressure from the reverse servo valve to at least one of said plurality of bypass clutches.

25. The method of claim 19, further comprising blocking said hydraulic pressure from a fail safe valve for an input clutch in an oil path that supplies the hydraulic pressure to the input clutch when the electric system operates normally.

26. The method of claim 25, further comprising blocking said hydraulic pressure in said oil path with said fail safe valve when the hydraulic pressure is received from a fail mode valve during said electric system failure.

27. The method of claim 19, further comprising supplying the hydraulic pressure to at least one of the plurality of bypass clutches using a fail mode valve to enable said reverse mode to be engaged.

\* \* \* \* \*